United States Patent
Rico Alvarino et al.

(10) Patent No.: US 10,980,044 B2
(45) Date of Patent: Apr. 13, 2021

(54) RATE MATCHING AND SEMI PERSISTENT SCHEDULING CONFIGURATION IN WIRELESS COMMUNICATIONS

(71) Applicant: QUALCOMM Incorporated, San Diego, CA (US)

(72) Inventors: Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/507,286

(22) Filed: Jul. 10, 2019

(65) Prior Publication Data

US 2020/0022163 A1    Jan. 16, 2020

Related U.S. Application Data

(60) Provisional application No. 62/697,726, filed on Jul. 13, 2018.

(51) Int. Cl.
*H04W 72/12* (2009.01)
*H04W 76/27* (2018.01)
(Continued)

(52) U.S. Cl.
CPC ....... *H04W 72/1257* (2013.01); *H04L 1/0004* (2013.01); *H04L 1/0026* (2013.01);
(Continued)

(58) Field of Classification Search
CPC ... H04W 72/1257; H04W 76/27; H04W 8/24; H04L 1/0004; H04L 1/0026; H04L 27/34
See application file for complete search history.

(56) References Cited

U.S. PATENT DOCUMENTS

2020/0021391 A1    1/2020    Rico Alvarino et al.

FOREIGN PATENT DOCUMENTS

| EP | 3076626 A1 | 10/2016 |
|---|---|---|
| EP | 3122141 A1 | 1/2017 |

OTHER PUBLICATIONS

Huawei: "Summary of Email Discussion [90b-LTE-16] on SPS details", 3GPP Draft; R1-1719958, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 17, 2017, XP051369210, Retrieved from the Internet: URL:http://www.3gpp.org/ftp/tsg%5Fran/WG1%5FRL1/TSGR1%5F91/Docs/ [retrieved on Nov. 17, 2017], 16 pages.

(Continued)

*Primary Examiner* — Ronald B Abelson
(74) *Attorney, Agent, or Firm* — Holland & Hart LLP

(57) ABSTRACT

Methods, systems, and devices for wireless communications are described for identifying a modulation and coding scheme (MCS) independently of a channel quality indicator (CQI) table that is configured at a user equipment (UE). A rate matching parameter may be determined based on one or more of the MCS or CQI table, which may be used for dimensioning a soft buffer that is used to store received transmissions for decoding. The MCS field may be a six-bit field and may indicate an MCS that exceeds a highest MCS associated with the CQI table. The base station may activate a semi-persistent scheduling (SPS) configuration at the UE through an activation command, and the UE may verify that SPS is activated based on information in a number of different fields of control information which may include the MCS field.

20 Claims, 23 Drawing Sheets

(51) Int. Cl.
*H04W 8/24* (2009.01)
*H04L 1/00* (2006.01)
*H04L 27/34* (2006.01)

(52) U.S. Cl.
CPC ............... *H04L 27/34* (2013.01); *H04W 8/24* (2013.01); *H04W 76/27* (2018.02)

(56) References Cited

OTHER PUBLICATIONS

International Search Report and Written Opinion—PCT/US2019/041404—ISA/EPO—dated Oct. 22, 2019.
"LTE; Evolved Universal Terrestrial Radio Access (E-UTRA); Multiplexing and Channel Coding (3GPP TS 36.212 Version 13.0.0 Release 13)", Technical Specification, European Telecommunications Standards Institute (ETSI), 650, Route Des Lucioles, F-06921 Sophia-Antipolis, France, vol. 3GPP RAN 1, No. V13.0.0, Jan. 1, 2016 (Jan. 1, 2016), XP014266405, Section 5.1.4.1.2.
Mediatek Inc: "Discussion on Modulation Enhancement", 3GPP Draft, 3GPP TSG-RAN WG1 Meeting #93, R1-1805992, Mediatek-MCS Enhancement, 3RD Generation PartnershipProject (3GPP), Mobile Competence Centre, 650, Route Des Lucioles, F-06921 Sophia-AntiPolis Cedex, France, vol. RAN WG1, No. Busan, Korea, May 5, 2018-May 25, 2018, May 20, 2018 (May 20, 2018), XP051441210, 6 pages,Retrieved from the Internet: URL:http://www.3gpp.org/ftp/Meetings%5F3GPP%5FSYNC/RAN1/Docs/ [retrieved on May 20, 2018] Sections 1 and 3.

| MCS Index | Modulation Order $Q_m$ | Modulation Order $Q'_m$ | TBS Index | Scaling |
|---|---|---|---|---|
| 0 | 2 | 2 | 0 | No |
| 1 | 2 | 2 | 1 | No |
| 2 | 2 | 2 | 2 | No |
| 3 | 2 | 2 | 3 | No |
| 4 | 2 | 2 | 4 | No |
| 5 | 2 | 4 | 5 | No |
| 6 | 2 | 4 | 6 | No |
| 7 | 2 | 4 | 7 | No |
| 8 | 2 | 4 | 8 | No |
| 9 | 2 | 4 | 9 | No |
| 10 | 4 | 6 | 9 | No |
| 11 | 4 | 6 | 10 | No |
| 12 | 4 | 6 | 11 | No |
| 13 | 4 | 6 | 12 | No |
| 14 | 4 | 6 | 13 | No |
| 15 | 4 | 6 | 14 | No |
| 16 | 4 | 6 | 15 | No |
| 17 | 6 | 6 | 15 | No |
| 18 | 6 | 6 | 16 | No |
| 19 | 6 | 6 | 17 | No |
| 20 | 6 | 6 | 18 | No |
| 21 | 6 | 6 | 19 | No |
| 22 | 6 | 6 | 20 | No |
| 23 | 6 | 6 | 21 | No |
| 24 | 6 | 6 | 22 | No |
| 25 | 6 | 6 | 23 | No |
| 26 | 6 | 6 | 24 | No |
| 27 | 6 | 6 | 25 | No |
| 28 | 8 | 8 | 25 | No |
| 29 | 8 | 8 | 27 | No |
| 30 | 8 | 8 | 28 | No |
| 31 | 8 | 8 | 29 | No |
| 32 | 8 | 8 | 30 | No |
| 33 | 8 | 8 | 31 | No |
| 34 | 8 | 8 | 32 | No |
| 35 | 8 | 8 | 33A | No |
| 36 | 8 | 8 | 33/33B | No |
| 37 | 10 | 10 | 34A | No |
| 38 | 10 | 10 | 35 | No |
| 39 | 10 | 10 | 36 | No |
| 40 | 10 | 10 | 37A | No |
| 41 | 10 | 10 | 37 | No |
| 42 | 2 | 2 | 0 | Yes |
| 43 | 2 | 2 | 2 | Yes |
| 44 | 6 | 6 | 27 | No |
| 45 | 6 | 6 | 28 | No |
| 46 | 4 | 6 | 9 | Yes |
| 47 | 4 | 6 | 11 | Yes |
| 48 | 4 | 6 | 13 | Yes |
| 49 | 6 | 6 | 15 | Yes |
| 50 | 6 | 6 | 17 | Yes |
| 51 | 6 | 6 | 19 | Yes |
| 52 | 6 | 6 | 21 | Yes |
| 53 | 8 | 8 | 25 | Yes |
| 54 | 8 | 8 | 28 | Yes |
| 55 | 8 | 8 | 30 | Yes |
| 56 | 8 | 8 | 32 | Yes |
| 57 | 10 | 10 | 34A | Yes |
| 58 | 10 | 10 | 36 | Yes |
| 59 | 2 | 2 | Reserved | |
| 60 | 4 | 4 | Reserved | |
| 61 | 6 | 6 | Reserved | |
| 62 | 8 | 8 | Reserved | |
| 63 | 10 | 10 | Reserved | |

FIG. 3

RATE MATCHING AND SEMI PERSISTENT SCHEDULING CONFIGURATION IN WIRELESS COMMUNICATIONS

CROSS REFERENCE

The present application for patent claims the benefit of U.S. Provisional Patent Application No. 62/697,726 by RICO ALVARINO, et al., entitled "RATE MATCHING AND SEMI PERSISTENT SCHEDULING CONFIGURATION IN WIRELESS COMMUNICATIONS," filed Jul. 13, 2018, assigned to the assignee hereof, and expressly incorporated by reference herein.

BACKGROUND

The present disclosure relates to wireless communications, and more specifically to rate matching and semi persistent scheduling configuration in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless communications systems may use different modulation schemes for wireless transmissions, such as binary phase shift keying (BPSK), quadrature phase shift keying (QPSK), 16 quadrature amplitude modulation (QAM), or 64 QAM, for example. Higher modulation orders may be implemented when channel conditions are relatively good, while lower modulation orders may be implemented in cases where channel conditions are relatively poor. Different coding schemes may be used in conjunction with different modulation schemes to enhance the likelihood of successful reception of transmissions. In some cases, a UE may measure channel conditions and provide a channel quality indication (CQI) report to a base station, which the base station may use to select a modulation and coding scheme (MCS) for subsequent communications with the UE. Further, in some systems, signaling that indicates a modulation order may also be used to provide other information (e.g., certain patterns of one or more bits in an MCS transmission may be used to confirm an activation of a semi-persistent scheduling (SPS) configuration at the UE). Enhanced flexibility for selecting modulation orders and indicating selected modulation orders to a UE may help to enhance efficiency of a wireless communications system.

SUMMARY

The described techniques relate to improved methods, systems, devices, and apparatuses that support rate matching and semi persistent scheduling configuration in wireless communications. Various described techniques provide for identifying a modulation and coding scheme (MCS) independently of a channel quality indicator (CQI) table that is configured at a user equipment (UE). A rate matching parameter may be determined based on one or more of the MCS or CQI table, which may be used for dimensioning a soft buffer that is used to store received transmissions for decoding. In some cases, the MCS may be indicated by a base station through an MCS field in control information that provides an index into an MCS table. In some cases, the MCS field may be a six-bit field and may indicate an MCS that exceeds a highest MCS associated with the CQI table.

In some cases, a base station may provide a UE with a semi persistent scheduling (SPS) configuration that allocates certain semi persistent wireless resources for recurring transmissions (e.g., voice call transmissions) without the need for signaling separate resource allocations for each transmission. The base station may activate a SPS configuration at the UE through an activation command, and the UE may verify that SPS is activated based on information in a number of different fields of control information which may include the MCS field. In cases where the MCS field is a six-bit field, the two most significant bits (MSBs) of the MCS field may be set to a predetermined value (e.g., both bits set to zero) to verify (in conjunction with predetermined values of one or more other fields) SPS activation. In cases where the MCS field indicates SPS activation, a first interpretation may be used to decode the MCS field, and in cases where SPS is not activated, a second interpretation may be used to decode the MCS field. In some cases, the first interpretation can signal an MCS of up to 64QAM, and the second interpretation can signal an MCS that exceeds 256QAM.

A method of wireless communication at a UE is described. The method may include identifying a CQI table that provides one or more parameters associated with one or more modulation orders for transmissions between the UE and a base station, receiving, from the base station, control information for a downlink transmission, the control information including a first index value for a first entry in an MCS table, where the first entry in the MCS table indicates a first modulation order independently of the one or more modulation orders of the CQI table, and determining a rate matching parameter for the downlink transmission based on at least one of the first modulation order or the CQI table.

An apparatus for wireless communication at a UE is described. The apparatus may include a processor, memory in electronic communication with the processor, and instructions stored in the memory. The instructions may be executable by the processor to cause the apparatus to identify a CQI table that provides one or more parameters associated with one or more modulation orders for transmissions between the UE and a base station, receive, from the base station, control information for a downlink transmission, the control information including a first index value for a first entry in an MCS table, where the first entry in the MCS table indicates a first modulation order independently of the one or more modulation orders of the CQI table, and determine a rate matching parameter for the downlink transmission based on at least one of the first modulation order or the CQI table.

Another apparatus for wireless communication at a UE is described. The apparatus may include means for identifying a CQI table that provides one or more parameters associated with one or more modulation orders for transmissions between the UE and a base station, receiving, from the base station, control information for a downlink transmission, the control information including a first index value for a first entry in an MCS table, where the first entry in the MCS table indicates a first modulation order independently of the one or more modulation orders of the CQI table, and determining a rate matching parameter for the downlink transmission based on at least one of the first modulation order or the CQI table.

A non-transitory computer-readable medium storing code for wireless communication at a UE is described. The code may include instructions executable by a processor to identify a CQI table that provides one or more parameters associated with one or more modulation orders for transmissions between the UE and a base station, receive, from the base station, control information for a downlink transmission, the control information including a first index value for a first entry in an MCS table, where the first entry in the MCS table indicates a first modulation order independently of the one or more modulation orders of the CQI table, and determine a rate matching parameter for the downlink transmission based on at least one of the first modulation order or the CQI table.

Some examples of the method, apparatuses, and non-transitory computer-readable medium described herein may further include operations, features, means, or instructions for discarding the control information when the first modulation order exceeds a maximum modulation order of the one or more modulation orders of the CQI table. Some examples of the method, apparatuses, and non-transitory computer-readable medium described herein may further include operations, features, means, or instructions for setting a power of receive circuitry based on the maximum modulation order of the one or more modulation orders of the CQI table.

In some examples of the method, apparatuses, and non-transitory computer-readable medium described herein, the determining the rate matching parameter may include operations, features, means, or instructions for determining that the first modulation order exceeds a maximum modulation order of the one or more modulation orders of the CQI table and determining the rate matching parameter based on a highest entry in the MCS table that has a modulation order that is supported by the UE. In some examples of the method, apparatuses, and non-transitory computer-readable medium described herein, the first index value may be a six-bit index value that identifies the first entry from 64 available entries of the MCS table. In some examples of the method, apparatuses, and non-transitory computer-readable medium described herein, the rate matching parameter may be based on a highest supported modulation order supported by the UE for a radio frequency band or band combination used for the downlink transmission.

Some examples of the method, apparatuses, and non-transitory computer-readable medium described herein may further include operations, features, means, or instructions for receiving RRC signaling that includes a signaled modulation order that may be different than a modulation order indicated in the first entry in the MCS table.

Some examples of the method, apparatuses, and non-transitory computer-readable medium described herein may further include operations, features, means, or instructions for determining a first transport block size (TB S) for the downlink transmission based on the first modulation order, comparing the first transport block size to a maximum transport block size that may be identified based on a maximum modulation order of the one or more modulation orders of the CQI table, receiving the downlink transmission when the first transport block size may be less than or equal to the maximum transport block size and discarding the control information when the first transport block size exceeds the maximum transport block size.

In some examples of the method, apparatuses, and non-transitory computer-readable medium described herein, the control information may be first control information and the downlink transmission may be a first downlink transmission. Some examples of the method, apparatuses, and non-transitory computer-readable medium described herein may further include operations, features, means, or instructions for receiving the first downlink transmission based on the determined rate matching parameter and the first modulation order, receiving, from the base station, second control information for a second downlink transmission, the second control information including a second index value for a second entry in the MCS table and receiving the second downlink transmission based on the first modulation order and the determined rate matching parameter. Some examples of the method, apparatuses, and non-transitory computer-readable medium described herein may further include operations, features, means, or instructions for transmitting, to the base station, a capability indication that indicates the UE is capable of operating at a modulation order that exceeds the maximum modulation order indicated by the CQI table.

Some examples of the method, apparatuses, and non-transitory computer-readable medium described herein may further include operations, features, means, or instructions for receiving, responsive to the capability indication, a modulation order indication that indicates that the base station will transmit one or more downlink transmissions having a modulation order that exceeds the maximum modulation order indicated by the CQI table and processing the control information based on the modulation order indication. Some examples of the method, apparatuses, and non-transitory computer-readable medium described herein may further include operations, features, means, or instructions for selecting an operating power for one or more receive components of the UE based on the modulation order indication.

A method of wireless communication at a base station is described. The method may include identifying a CQI table that provides one or more parameters associated with one or more modulation orders for transmissions between the base station and a UE, transmitting, to the UE, control information for a downlink transmission, the control information including a first index value for a first entry in an MCS table, where the first entry in the MCS table indicates a first modulation order independently of the one or more modulation orders of the CQI table, and transmitting the downlink transmission to the UE using the first modulation order.

An apparatus for wireless communication at a base station is described. The apparatus may include a processor, memory in electronic communication with the processor, and instructions stored in the memory. The instructions may be executable by the processor to cause the apparatus to identify a CQI table that provides one or more parameters associated with one or more modulation orders for transmissions between the base station and a UE, transmit, to the UE, control information for a downlink transmission, the control information including a first index value for a first entry in an MCS table, where the first entry in the MCS table indicates a first modulation order independently of the one or more modulation orders of the CQI table, and transmit the downlink transmission to the UE using the first modulation order.

Another apparatus for wireless communication at a base station is described. The apparatus may include means for identifying a CQI table that provides one or more parameters associated with one or more modulation orders for transmissions between the base station and a UE, transmitting, to the UE, control information for a downlink transmission, the control information including a first index value for a first entry in an MCS table, where the first entry in the MCS table indicates a first modulation order independently of the one or more modulation orders of the CQI table, and transmitting the downlink transmission to the UE using the first modulation order.

A non-transitory computer-readable medium storing code for wireless communication at a base station is described. The code may include instructions executable by a processor to identify a CQI table that provides one or more parameters associated with one or more modulation orders for transmissions between the base station and a UE, transmit, to the UE, control information for a downlink transmission, the control information including a first index value for a first entry in an MCS table, where the first entry in the MCS table indicates a first modulation order independently of the one or more modulation orders of the CQI table, and transmit the downlink transmission to the UE using the first modulation order.

In some examples of the method, apparatuses, and non-transitory computer-readable medium described herein, the first index value may be a six-bit index value that identifies the first entry from 64 available entries of the MCS table. In some examples of the method, apparatuses, and non-transitory computer-readable medium described herein, the first modulation order may be selected to be at or below a maximum modulation order of the one or more modulation orders of the CQI table.

Some examples of the method, apparatuses, and non-transitory computer-readable medium described herein may further include operations, features, means, or instructions for determining a highest modulation order supported by the UE for a radio frequency band or band combination to be used for the downlink transmission, selecting the first modulation order as the highest modulation order, where the first modulation order corresponds to or exceeds a maximum modulation order of the one or more modulation orders of the CQI table and transmitting the downlink transmission using the highest modulation order supported by the UE. Some examples of the method, apparatuses, and non-transitory computer-readable medium described herein may further include operations, features, means, or instructions for transmitting RRC signaling that includes a signaled modulation order that may be different than a modulation order indicated in the first entry in the MCS table.

Some examples of the method, apparatuses, and non-transitory computer-readable medium described herein may further include operations, features, means, or instructions for determining a first transport block size for the downlink transmission that may be less than or equal to a maximum transport block size that may be identified based on a maximum modulation order of the one or more modulation orders of the CQI table, and where the downlink transmission uses the first transport block size.

In some examples of the method, apparatuses, and non-transitory computer-readable medium described herein, the control information may be first control information and the downlink transmission may be a first downlink transmission, and may include operations, features, means, or instructions for transmitting, to the UE, second control information for a second downlink transmission, the second control information including a second index value for a second entry in the MCS table and transmitting the second downlink transmission using the first modulation order.

Some examples of the method, apparatuses, and non-transitory computer-readable medium described herein may further include operations, features, means, or instructions for receiving, from the UE, a capability indication that indicates the UE is capable of operating at a modulation order that exceeds the maximum modulation order indicated by the CQI table. Some examples of the method, apparatuses, and non-transitory computer-readable medium described herein may further include operations, features, means, or instructions for transmitting, responsive to the capability indication, a modulation order indication that indicates that the base station will transmit one or more downlink transmissions having a modulation order that exceeds the maximum modulation order indicated by the CQI table.

A method of wireless communication at a UE is described. The method may include receiving, from a base station, a SPS configuration, decoding control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determining whether SPS communications are activated based on the decoding.

An apparatus for wireless communication at a UE is described. The apparatus may include a processor, memory in electronic communication with the processor, and instructions stored in the memory. The instructions may be executable by the processor to cause the apparatus to receive, from a base station, a SPS configuration, decode control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determine whether SPS communications are activated based on the decoding.

Another apparatus for wireless communication at a UE is described. The apparatus may include means for receiving, from a base station, a SPS configuration, decoding control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determining whether SPS communications are activated based on the decoding.

A non-transitory computer-readable medium storing code for wireless communication at a UE is described. The code may include instructions executable by a processor to receive, from a base station, a SPS configuration, decode control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determine whether SPS communications are activated based on the decoding.

In some examples of the method, apparatuses, and non-transitory computer-readable medium described herein the MCS field may be a six-bit MCS field, and a subset of bits of the six-bit MCS field may be used for the first interpretation. In some examples of the method, apparatuses, and non-transitory computer-readable medium described herein, the two most significant bits of the MCS field may be set to zero for the first interpretation. In some examples of the method, apparatuses, and non-transitory computer-readable medium described herein retransmissions of information in the MCS field may be disallowed for the first interpretation.

In some examples of the method, apparatuses, and non-transitory computer-readable medium described herein, the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries. In some examples of the method, apparatuses, and non-transitory computer-readable medium described herein, the second subset of entries include one or more entries of the MCS table that indicate scaling parameters, one or more entries indicating a modulation order that exceeds a 64 QAM modulation order, one or more entries for retransmissions of MCS, or any combinations thereof.

In some examples of the method, apparatuses, and non-transitory computer-readable medium described herein, the determining whether SPS communications is activated may include operations, features, means, or instructions for determining that one or more fields in the control information are set to predetermined values that indicate that SPS communications are activated, the one or more fields including the MCS field in which two most significant bits set to zero indicates SPS communications are activated.

In some examples of the method, apparatuses, and non-transitory computer-readable medium described herein, the control information may be first control information that activates SPS communications. Some examples of the method, apparatuses, and non-transitory computer-readable medium described herein may further include operations, features, means, or instructions for communicating with the base station using SPS transmissions, decoding second control information from the base station that indicates that SPS communications are deactivated, where the MCS field of the second control information includes a six-bit field in which each bit is set to one, and discontinuing the SPS communications.

A method of wireless communication at a base station is described. The method may include configuring a UE with a SPS configuration, determining to activate SPS communications with the UE according to the SPS configuration, formatting control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmitting the control information to the UE.

An apparatus for wireless communication at a base station is described. The apparatus may include a processor, memory in electronic communication with the processor, and instructions stored in the memory. The instructions may be executable by the processor to cause the apparatus to configure a UE with a SPS configuration, determine to activate SPS communications with the UE according to the SPS configuration, format control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmit the control information to the UE.

Another apparatus for wireless communication at a base station is described. The apparatus may include means for configuring a UE with a SPS configuration, determining to activate SPS communications with the UE according to the SPS configuration, formatting control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmitting the control information to the UE.

A non-transitory computer-readable medium storing code for wireless communication at a base station is described. The code may include instructions executable by a processor to configure a UE with a SPS configuration, determine to activate SPS communications with the UE according to the SPS configuration, format control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmit the control information to the UE.

In some examples of the method, apparatuses, and non-transitory computer-readable medium described herein the MCS field may be a six-bit MCS field, and a subset of bits of the six-bit MCS field may be used for the first interpretation. In some examples of the method, apparatuses, and non-transitory computer-readable medium described herein, the formatting further may include operations, features, means, or instructions for setting two most significant bits of the MCS field to zero for the first interpretation. In some examples of the method, apparatuses, and non-transitory computer-readable medium described herein retransmitting of information in the MCS field is disallowed for the first interpretation. In some examples of the method, apparatuses, and non-transitory computer-readable medium described herein, the MCS field for the first interpretation may be capable of indicating a first subset of entries of an MCS table, and the MCS field for the second interpretation may be capable of indicating the first subset of entries of the MCS table and a second subset of entries of the MCS table that is different than the first subset of entries. In some examples of the method, apparatuses, and non-transitory computer-readable medium described herein, the second subset of entries include one or more entries of the MCS table that indicate scaling parameters, one or more entries indicating a modulation order that exceeds a 64 QAM modulation order, one or more entries for retransmissions of MCS, or any combinations thereof.

In some examples of the method, apparatuses, and non-transitory computer-readable medium described herein, the formatting control information to activate the SPS communications may include operations, features, means, or instructions for setting one or more fields in the control information to predetermined values that indicate that SPS is activated, the one or more fields including the MCS field in which two most significant bits may be set to zero to indicate SPS communications is activated. Some examples of the method, apparatuses, and non-transitory computer-readable medium described herein may further include operations, features, means, or instructions for communicating with the UE using SPS transmissions, determining to deactivate the SPS communications, formatting second control information that indicates that SPS communications are deactivated, where the MCS field of the second control information includes a six-bit field in which each bit is set to one, transmitting the second control information to the UE and discontinuing the SPS communications.

BRIEF DESCRIPTION OF THE DRAWINGS

FIG. 3 illustrates an example of an MCS table that supports rate matching and semi persistent scheduling configuration in wireless communications in accordance with aspects of the present disclosure.

DETAILED DESCRIPTION

Figure 1:
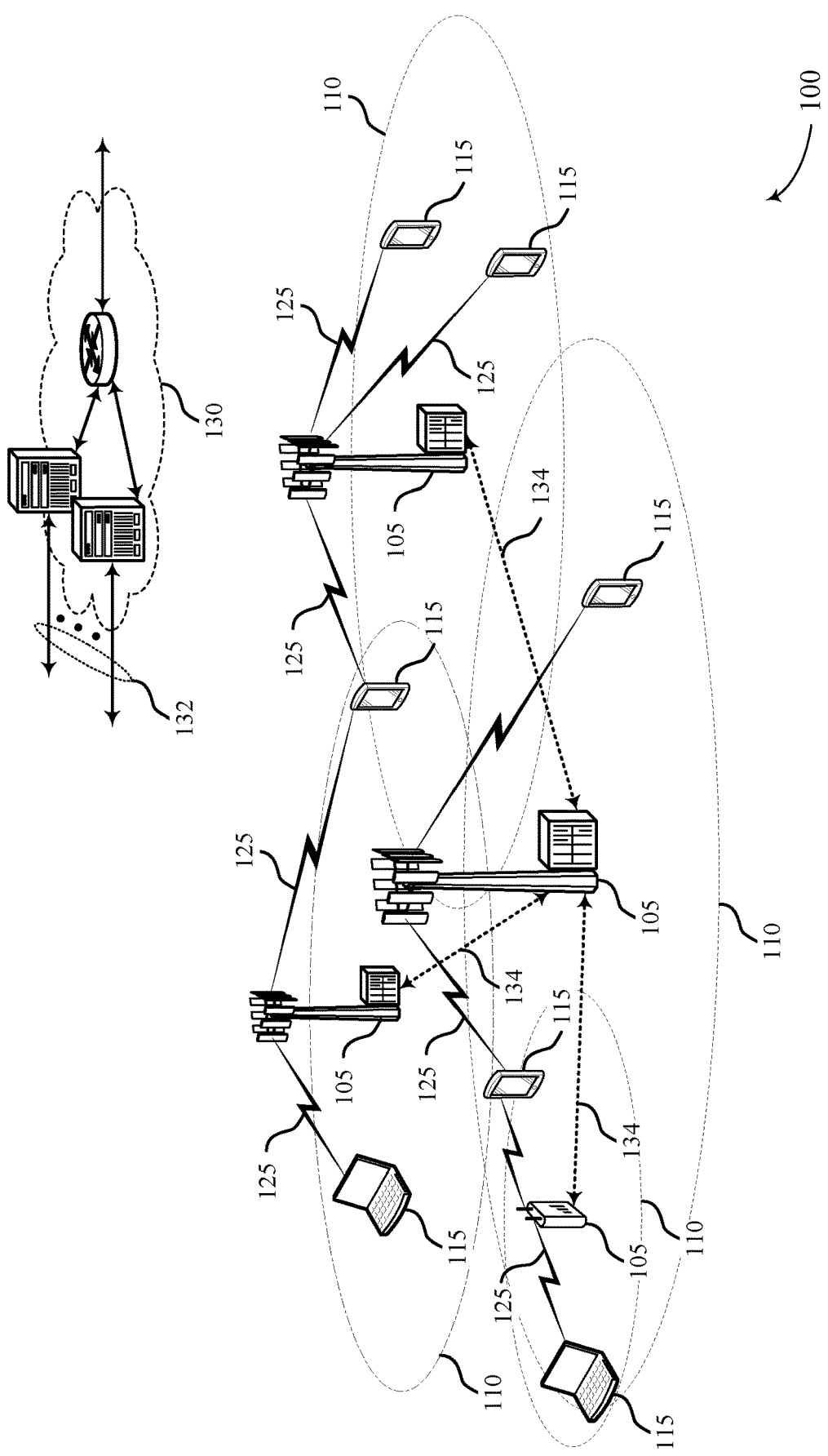
FIG. 1 illustrates an example of a system for wireless communications that supports rate matching and semi persistent scheduling configuration in wireless communications in accordance with aspects of the present disclosure.

Various aspects of the present disclosure provide for determining one or more channel quality indicator (CQI), modulation and coding scheme (MCS), rate matching, or semi persistent scheduling (SPS) parameters based on a configured CQI or MCS table and an indicated MCS. In some cases, a modulation order indicated by the MCS may be independent of, and exceed a maximum modulation order associated with, the CQI table. A rate matching parameter may be determined based on one or more of the MCS or CQI table, which may be used for dimensioning a soft buffer that is used to store received transmissions for decoding. In some cases, the MCS may be indicated by a base station through an MCS field in control information that provides an index into an MCS table. In some cases, the MCS field may be a six-bit field and may indicate an MCS of up to 1024QAM.

In some cases, a base station may provide a UE with a SPS configuration, and may activate the SPS configuration at the UE through an activation command. The UE may verify that SPS is activated based on information in a number of different fields of control information which may include the MCS field. In cases where the MCS field is a six-bit field, the two most significant bits (MSBs) of the MCS field may be set to a predetermined value (e.g., both bits set to zero) to verify (in conjunction with predetermined values of one or more other fields) SPS activation. In cases where the MCS field indicates SPS activation, a first interpretation may be used to decode the MCS field, and in cases where SPS is not activated, a second interpretation may be used to decode the MCS field. In some cases, the first interpretation can signal an MCS of up to 64QAM, and the second interpretation can signal an MCS that exceeds 256QAM.

Such techniques may provide enhanced flexibility for UEs and base stations to identify a CQI table at the UE, which may have an associated set of modulation orders, and signal an MCS that may have a different modulation order than associated with the CQI table.

In such cases, modulation order may be changed based on channel conditions at the UE without the need to reconfigure an established connection with a different CQI table. In some cases, additional flexibility may also be provided through an MCS table that has 64 entries that are indexed by a six-bit MCS field that may be signaled by a base station. In some legacy LTE systems, a 32 entry MCS table may be employed, and thus a 64-entry table may provide for additional options that may be selected based on dynamic channel conditions of a UE, with up to 1024QAM available in some cases when the UE has suitable channel conditions.

Aspects of the disclosure are initially described in the context of a wireless communications system and examples of MCS tables and MCS fields. Aspects of the disclosure are further illustrated by and described with reference to apparatus diagrams, system diagrams, and flowcharts that relate to rate matching and semi persistent scheduling configuration in wireless communications.

FIG. 1 illustrates an example of a wireless communications system 100 that supports rate matching and semi persistent scheduling configuration in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may support relatively high modulation orders (e.g., modulation orders up to 1024QAM) that may be indicated via an MCS indication that is independent of a CQI table that is configured at a UE 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105.

The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, a base station 105 and UE 115 may establish a connection and, as part of the connection establishment, identify a CQI table. The CQI table may contain a mapping between a CQI that is measured at the UE 115, and a modulation order and coding rate. Following the connection establishment, the base station 105 may allocate resources for a downlink transmission (e.g., a physical downlink shared channel (PDSCH) transmission) and provide downlink control information (DCI) to the UE that indicates that allocated resources and an MCS associated with the transmission. In some cases, a modulation order indicated by the MCS may be independent of, and exceed a maximum modulation order associated with, the CQI table. The UE 115 may determine a rate matching parameter based on one or more of the MCS or CQI table, which may be used for dimensioning a soft buffer that is used to store received transmissions for decoding. In some cases, the MCS may be indicated by the base station 105 through an MCS field in the DCI that provides an index into an MCS table. In some cases, the MCS field may be a six-bit field and may indicate an MCS of up to 1024QAM.

In some cases, a base station 105 may provide a UE 115 with a SPS configuration, and may activate the SPS configuration at the UE 115 through an activation command. The UE 115 may verify that SPS is activated based on values for a number of different fields of the DCI, which may include the MCS field. In cases where the MCS field is a six-bit field, the two MSBs of the MCS field may be set to a predetermined value (e.g., both bits set to zero) to verify (in conjunction with predetermined values of one or more other fields) SPS activation. In cases where the MCS field indicates SPS activation, a first interpretation may be used to decode the MCS field, and in cases where SPS is not activated, a second interpretation may be used to decode the MCS field. In some cases, the first interpretation can signal an MCS of up to 64QAM, and the second interpretation can signal an MCS that exceeds 256QAM.

Figure 2:
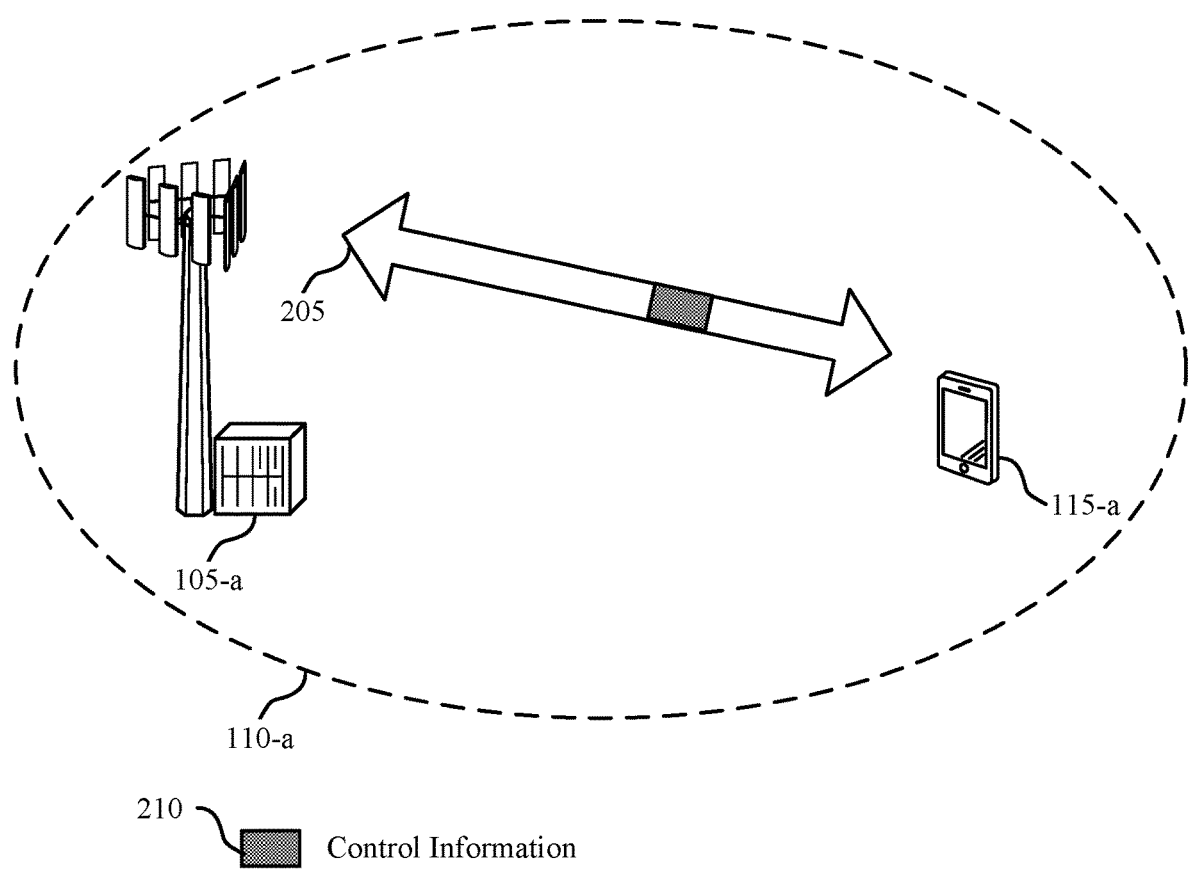
FIG. 2 illustrates an example of a portion of wireless communications system that supports rate matching and semi persistent scheduling configuration in wireless communications in accordance with aspects of the present disclosure.

FIG. 2 illustrates an example of a portion of a wireless communications system 200 that supports rate matching and semi persistent scheduling configuration in wireless communications in accordance with aspects of the present disclosure. In some examples, wireless communications system 200 may implement aspects of wireless communications system 100. Wireless communications system 200 may include base station 105-a and UE 115-a, which may be examples of a base station 105 and a UE 115 described with reference to FIG. 1. In some examples, base station 105-a may be in communication with one or more UEs 115 within geographic coverage area 110-a. In this example, wireless communications system 200 may support a communications link 205 with relatively high modulation orders, such as 256QAM or 1024QAM, and control information 210 may provide a six-bit MCS field that provides an index into a 64-entry MCS table.

In some cases, as part of a connection establishment to establish the communication link 205, the UE 115-a may provide a CQI report and the base station 105-a may configure a CQI table that is to be used at the UE 115-a. The CQI table may map modulation orders and coding rates to a number (e.g., 16) of index values that are based on CQI values measured at the UE 115-a. In some legacy LTE or NR systems, the indicated MCS in DCI is linked to the modulation orders of the CQI table, and thus the signaled MCS and the CQI table may be used by the UE 115-a to determine a modulation order, coding rate, and a transport block size for a transmission. Further, the UE 115-a may perform rate-matching on received downlink transmissions and place transport blocks in a soft-buffer for decoding. The rate matching in such cases may be based on the configured CQI table, in which the UE 115-a configures its soft buffer dimensioning in accordance with the MCS and coding rate. For example, in some cases UE 115-a may determine a number of bits ($N_{IR}$) for a transport block and a soft buffer size for a particular code block ($N_{cb}$) based on a value ($K_C$) that is associated with a configured CQI table (e.g., according to 3GPP TS 36.212, section 5.1.4). In some cases, $N_{IR}$ is obtained according to:

$$N_{IR} = \left\lfloor \frac{N_{soft}}{K_C \cdot K_{MIMO} \cdot \min(M_{DL\_HARQ}, M_{limit})} \right\rfloor$$

and the size $N_{cb}$ is obtained according to:

$$N_{cb} = \min\left(\left\lfloor \frac{N_{IR}}{C} \right\rfloor, K_w\right)$$

where $N_{soft}$ is the total number of soft channel bits according to the UE category; $K_{MIMO}$ is equal to either one or two based on a transmission mode of the UE; $M_{DL\_HARQ}$ is the maximum number of DL HARQ processes; $M_{limit}$ is a constant equal to 8; $K_w$ is the total number of coded bits, and C is the number of code blocks. As indicated, the value of $K_C$ may be predetermined based on a CQI table that is configured at the UE 115-a. For example, in some cases (e.g., according to 3GPP TS 36.212), the value of $K_C$ may be determined as follows:

if the UE is configured by higher layers with altCQI-Table-1024QAM-r15,
$K_C$=8/5
else if the UE is configured by higher layers with altCQI-Table-r12,
$K_C$=2
else
$K_C$=8/3.

However, in some deployments, the modulation order of the signaled MCS may be independent of the CQI table, and in some cases the signaled MCS may exceed a maximum modulation order associated with the CQI table. In such cases, the UE 115-a may use one or more other techniques to determine rate matching and a soft buffer size. In some examples, when the UE 115-a is configured with a six-bit MCS field in the control information 210, the base station 105-*a* may have a constraint that it is not to schedule the UE 115-*a* with a modulation order that exceeds the highest modulation order of the configured CQI table. The UE 115-*a* may thus expect to receive such an MCS and may discard or ignore a DCI transmission from the base station 105-*a* that indicates a higher MCS. For example, if the UE 115-*a* is configured with a 256QAM CQI table (in which a highest modulation order associated with the CQI table is 256QAM), the UE 115-*a* is not expected to be scheduled with 1024QAM, and the base station 105-*a* will schedule 256QAM or lower modulation orders. Similarly, if the UE 115-*a* is configured with a 64QAM CQI table, the UE 115-*a* is not expected to be scheduled with 256QAM or 1024QAM. Further, in some cases the UE 115-*a* may set a power level of receive RF circuitry based on the CQI table, and if a lower modulation order is configured in the CQI table the UE 115-*a* may be able to reduce the power level of the RF circuitry. In such examples, the rate matching behavior at the UE 115-*a* thus follows the configured CQI table. In some other examples, the UE 115-*a* may, when the MCS indicates a modulation order that exceeds the highest modulation order of the configured CQI table, reinterpret the signaled MCS and move to the highest MCS with supportable modulation scheme.

In some other examples, when the UE 115-*a* is configured with the six-bit MCS field, the rate matching behavior may be set to be the maximum supported modulation scheme in that band in the band combination of the carrier that is used for a transmission. For example, if the UE 115-*a* is configured with a 256QAM CQI table, but UE 115-*a* supports 1024QAM in the carrier band in the band combination, then the UE 115-*a* performs rate matching assuming 1024QAM. In some examples that employ this technique, the value of $K_C$ may be determined as follows:

if the UE is configured by higher layers with altCQI-Table-1024QAM-r15, or if the UE is configured by higher layers with altMCS-Table and the UE indicates support of 1024QAM in the band of band combination
$K_C=8/5$
else if the UE is configured by higher layers with altCQI-Table-r12, or if the UE is configured by higher layers with altMCS-Table and the UE indicates support of 256QAM (in the band of band combination)
$K_C=2$
else
$K_C=8/3$.

In some further examples, the base station 105-*a* may explicitly signal the reference modulation scheme to use for the rate matching (e.g. via a separate parameter that is configured per component carrier). Such cases may allow the base station 105-*a* to implement a six-bit MCS field, but not 1024QAM (e.g. not understanding the capability for 1024QAM), for example. In some examples that employ this technique, the value of $K_C$ may be determined as follows:

if the UE is configured by higher layers with altCQI-Table-1024QAM-r15, or if the UE is configured by higher layers with altMCS-Table and altMCS-Table-referenceModulation=1024QAM
$K_C=8/5$
else if the UE is configured by higher layers with altCQI-Table-r12, or if the UE is configured by higher layers with altMCS-Table and altMCS-Table-referenceModulation=256QAM
$K_C=2$
else
$K_C=8/3$.

In still further examples, the base station 105-*a* may provide a constraint on the maximum scheduled transport block size, instead of modulation scheme. Such a technique recognizes that for small transport block size values, the rate matching behavior is the same regardless of modulation scheme (i.e., due to minimum operator employed in determining Nib as discussed above). In such examples, maximum transport block sizes may be identified as follows:

Maximum transport block size for 64-QAM: 75376;
Maximum transport block size for 256-QAM: 100752;
Maximum transport block size for 1024-QAM: 125808.

Thus, for a transport block size mapped to single layer, if the UE 115-*a* is configured with CQI table for 64QAM, the UE may not be expected to receive transport block size of greater than 75376, and if the UE 115-*a* is configured with CQI table for 256QAM, the UE 115-*a* is not expected to receive transport block size of greater than 100752. In cases where transport block size is mapped to multiple layers, similar maximum transport block sizes may be identified.

In further examples, the UE 115-*a* may perform rate matching by following the signaled MCS and modulation scheme for the first transmission from the base station 105-*a* following configuration with a particular CQI table. In some examples that employ this technique, the value of $K_C$ may be determined as follows:

if the UE is configured by higher layers with altCQI-Table-1024QAM-r15, or if the UE is configured by higher layers with altMCS-Table and the first transmission of the transport block size is using 1024QAM
$K_C=8/5$
else if the UE is configured by higher layers with altCQI-Table-r12, or if the UE is configured by higher layers with altMCS-Table and the first transmission of the transport block size is using 256QAM
$K_C=2$
else
$K_C=8/3$.

Thus, the base station 105-*a* and UE 115-*a* may use such techniques when configured with a six-bit MCS field to determine rate matching parameters for transmissions. Additionally, in some cases the UE 115-*a* may have the capability to adjust RF power settings. For example, the UE 115-*a* may have the capability to put its RF front end in a "low fidelity" mode for power savings, which may reduce the maximum modulation scheme that the UE 115-*a* can support. In some cases, the UE 115-*a* may select such a "low fidelity mode" for operation (e.g., based on prior transmissions of the base station 105-*a*, power consumption, available battery power, thermal limits, one or more other parameters, or combinations thereof), and the UE 115-*a* may fail decoding if a grant is received with a higher modulation order than expected. In cases where the UE selects a "high fidelity mode" for operation, it may receive higher modulation order transmissions, but may burn unnecessary power in the event that the base station 105-*a* does not schedule higher modulation order transmissions. In some cases, the UE 115-*a* may transmit a capability indication to the base station 105-*a* that indicates whether the UE 115-*a* expects to receive higher modulation order transmissions. In some cases, the capability indication may indicate whether the UE 115-*a* supports receiving higher modulation order than in the configured CQI table. In some cases, responsive to the capability indication, the base station 105-*a* may provide a configuration to the UE 115-*a* that indicates whether to monitor for and/or expect higher modulation order than in the configured CQI table.

FIG. 3 illustrates an example of an MCS table 300 that supports rate matching and semi persistent scheduling configuration in wireless communications in accordance with aspects of the present disclosure. In some examples, MCS table 300 may be implemented in aspects of wireless communications system 100 or 200. As discussed above, in some cases a six-bit MCS field may be used to indicate an MCS to a UE, in which the value of the six-bit field corresponds to an MCS index 305 into a 64-entry MCS table 300. The MCS table 300 may include a column for a first modulation order Q 310, a column for a second modulation order Q 315 for use by UEs that are scheduled in a single slot of a subframe, a transport block size index 320 column, and a scaling 325 column.

In this example, rows 335 correspond to entries where scaling is "yes," which indicate that a scaling value is applied to account for overhead. In some examples, for the entries with "scaling=No," the UE follows legacy procedure to determine the transport block size, and for the entries with "scaling=Yes" (i.e., entries in rows 335-a and 335-b) the UE selects the transport block size by scaling the number of allocated PRBs by a factor α, where a is RRC configured. Entries 330 in this example are reserved entries for retransmissions.

Figure 4:
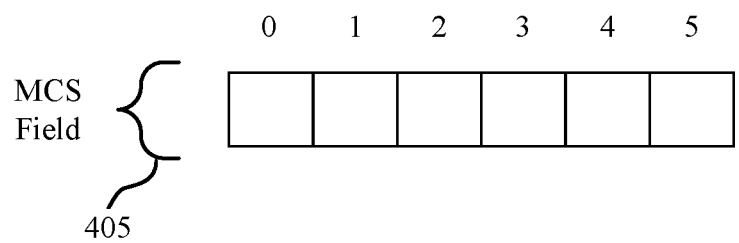
FIG. 4 illustrates an example of a six-bit MCS field that supports rate matching and semi persistent scheduling configuration in wireless communications in accordance with aspects of the present disclosure.
Figure 4:
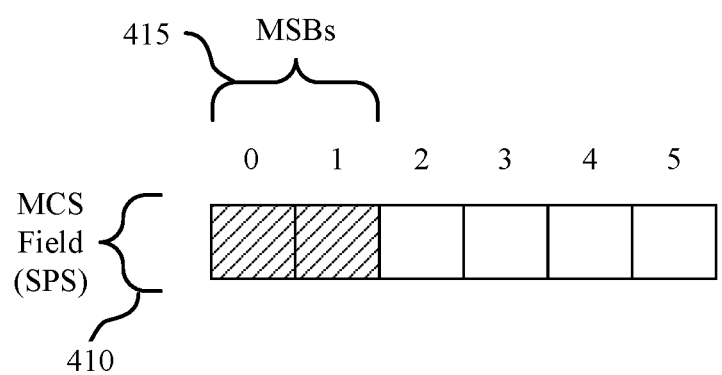

FIG. 4 illustrates an example of six-bit MCS fields 400 that supports rate matching and semi persistent scheduling configuration in wireless communications in accordance with aspects of the present disclosure. In some examples, six-bit MCS fields 400 may be implemented in aspects of wireless communications system 100 or 200. In this example, six-bit MCS field 405 may be used to indicate an index value into MCS table (e.g., MCS table 300). In some cases, as indicated above, a UE may be configured with an SPS configuration, and in such cases MCS field 410 may be scrambled by a different identifier that indicates that a DCI is for SPS. For example, MCS field 405 may be scrambled by a cell radio network temporary identifier (C-RNTI) and MCS field 410 may be scrambled by a separate SPS C-RNTI. In this example, the two most significant bits 315 of the MCS field 410 may be set to a predetermined value (e.g., 0, 0) to indicate SPS is activated at the UE. In some cases, for DCI scrambled with SPS C-RNTI, and if the DCI has six-bit field for MCS, the UE may interpret the MCS field 410 as being mapped to a five-bit 64QAM MCS table (32 entries) with one or more of the following constraints: 1) the two MSBs 415 of MCS field 410 are set to zero, or 2) retransmission MCS is disallowed (i.e., MCS between 29 and 31 of the five-bit 64QAM MCS table). In other cases, rather than having the two MSBs 415 set to zero, only a subset of entries of the MCS table may be configured for MCS field 410. In other cases, the six-bit MCS table may be used, but with one or more of the following constraints: 1) the scaling entries are not signaled (e.g., UE may discard the DCI if it receives such grant); 2) only up to 64-QAM entries are signaled, or 3) retransmission MCS is disallowed (i.e., MCS between 59 and 63 of MCS table 300).

As also indicated above, SPS may be activated and deactivated at a UE by a base station. In some cases, when the UE is configured with a six-bit MCS field, SPS activation may be verified based on the values in the different DCI fields as indicated in Table 1, and SPS deactivation may be verified based on the values in the different DCI fields as indicated in Table 2:

TABLE 1

Field values for SPS Activation

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' if present | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' for 5-bit MCS field, otherwise two MSB are set to '0' | For the enabled transport block: MSB is set to '0' for 5-bit MCS field, otherwise two MSB are set to '0' |
| Redundancy version | N/A | set to '00' | For the enabled transport block: set to '00' |

TABLE 2

Field values for SPS Release.

|  | DCI format 0 | DCI format 1A |
|---|---|---|
| TPC command for scheduled PUSCH | set to '00' | N/A |
| Cyclic shift DM RS | set to '000' if present | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | 5-bit field: set to '11111' 6-bit field: set to '111111' |
| Redundancy version | N/A | set to '00' |
| Resource block assignment | N/A | Set to all '1's |

Figure 5:
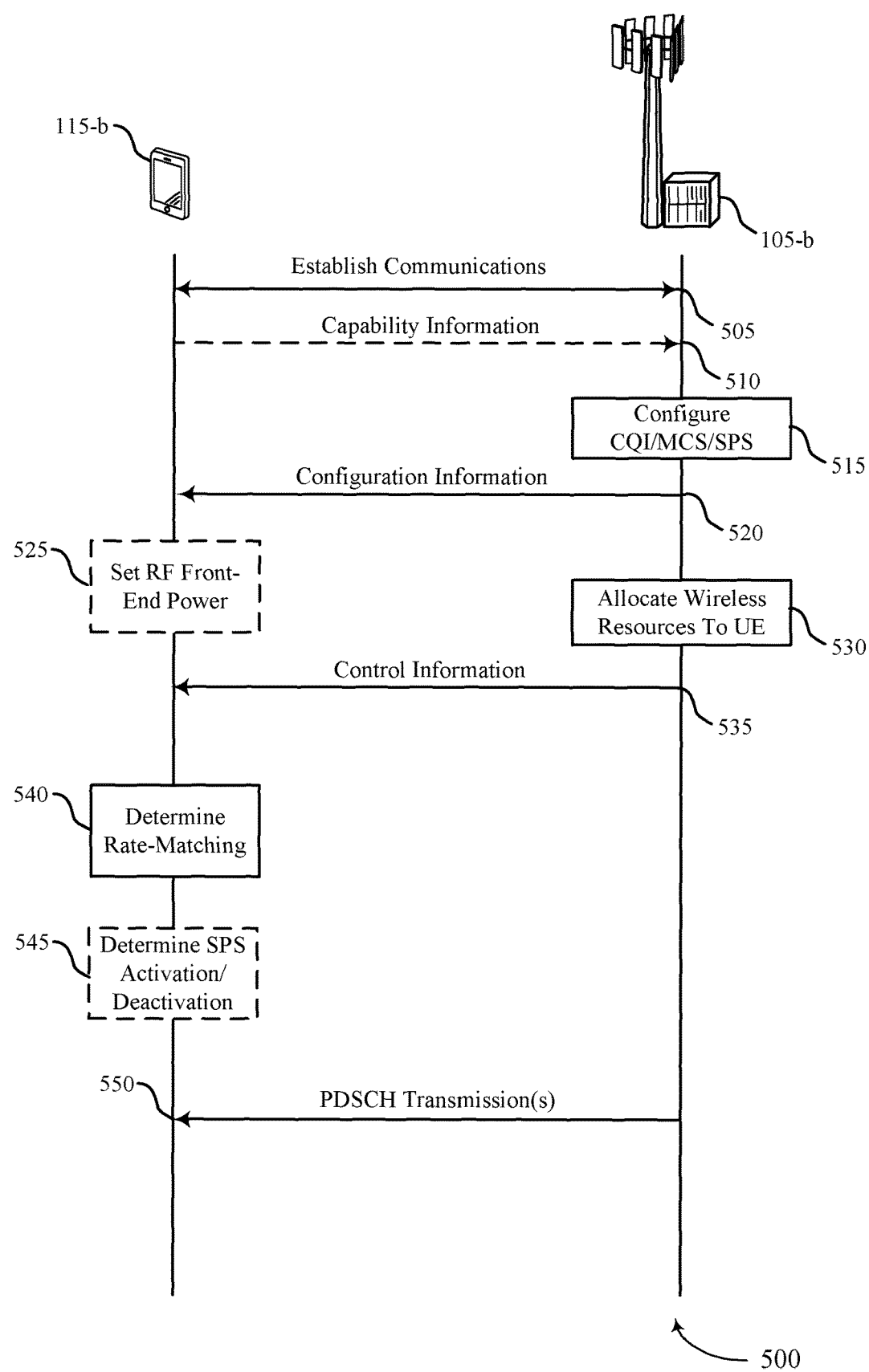
FIG. 5 illustrates an example of a process flow that supports rate matching and semi persistent scheduling configuration in wireless communications in accordance with aspects of the present disclosure.

FIG. 5 illustrates an example of a process flow 500 that supports rate matching and semi persistent scheduling configuration in wireless communications in accordance with aspects of the present disclosure. In some examples, process flow 500 may be implemented in aspects of wireless communications system 100 or 200. Process flow 500 may include UE 115-b and base station 105-b, which may be respective examples of a UE 115 and a base station 105 as described herein. Process flow 500 may implement techniques for rate matching and SPS configuration in accordance with aspects of the present disclosure.

At 505, UE 115-b and base station 105-b may establish communications. In some cases, during connection establishment (e.g., RRC connection establishment or RRC connection reconfiguration), base station 105-b may configure UE 115-b with a six-bit MCS table that may indicate an MCS independently of a highest MCS of a configured CQI table.

At 510, the UE 115-b may optionally transmit a capability information that may indicate whether the UE 115-b has capability for higher modulation orders such as 256QAM or 1024QAM. In some cases, the UE 115-*b* may transmit the capability information based on current conditions at the UE 115-*b*. For example, if the UE 115-*b* has a relatively low battery level, or is at or near a high thermal limit, an indication that the UE 115-*b* is only capable of 64QAM (or lower) modulation orders may be transmitted.

At 515, the base station 105-*b* may configure CQI, MCS, and SPS parameters, which may be transmitted to the UE 115-*b* at 520. In some cases, the CQI parameters may configure a CQI table at the UE 115-*b*. In accordance with techniques as discussed above, the MCS configuration may indicate whether an MCS that exceeds a highest modulation order of the CQI table may be transmitted by the base station 105-*a*. In cases where the UE 115-*b* has provided capability information, the configuration information may indicate whether higher order modulation (e.g., 256QAM or 1024AM) will be used.

At 525, the UE 115-*b* may optionally set a RF front end power based on the configuration information provided by the base station 105-*b*. In cases where only relatively low modulation orders may be used for transmissions to the UE 115-*b*, the RF front end power may be set at a low fidelity mode that consumes relatively low power, and in cases where higher modulation orders may be used, the RF front end power may be set at a high fidelity mode that consumes relatively more power.

At 530, the base station 105-*b* may allocate wireless resources to the UE 115-*b*. The base station 105-*b* may allocate a certain amount of wireless resources for a downlink transmission, and may also select an MCS for the downlink transmission. The base station 105-*b* may format downlink control information that indicates the allocated resources and the MCS, and may transmit the control information to the UE 115-*b* at 535.

At 540, the UE 115-*b* may determine one or more rate-matching parameters for the downlink transmission. The UE 115-*b* may determine such rate matching parameters in accordance with one or more of the techniques as discussed above. For example, in some cases the modulation order indicated in the control information may exceed the highest modulation order that is associated with the configured CQI table, and the UE 115-*b* may determine rate matching based on the higher modulation order. In other cases, the base station 105-*b* may schedule the downlink transmission such that the modulation order does not exceed the maximum modulation order of the configured CQI table.

At 545, the UE 115-*b* may optionally determine SPS activation or deactivation. In some cases, the activation or deactivation may be determined based at least in part on a predetermined set of fields in the control information having predetermined values, such as illustrated in Table 1 and Table 2.

At 550, the base station 105-*b* may transmit and the UE 115-*b* may receive downlink transmission(s), such as PDSCH transmissions. The UE 115-*b* may buffer received signals of the downlink transmission(s) in a soft buffer in accordance with the determined rate matching parameter. The UE 115-*b* may then attempt to decode the buffered signals and thus decode the downlink transmission(s). In cases, where decoding is not successful, a negative acknowledgment may be transmitted to the base station 105-*b* followed by a retransmission, and received retransmission signals may be added to the soft buffer for further attempted decoding.

Figure 6:
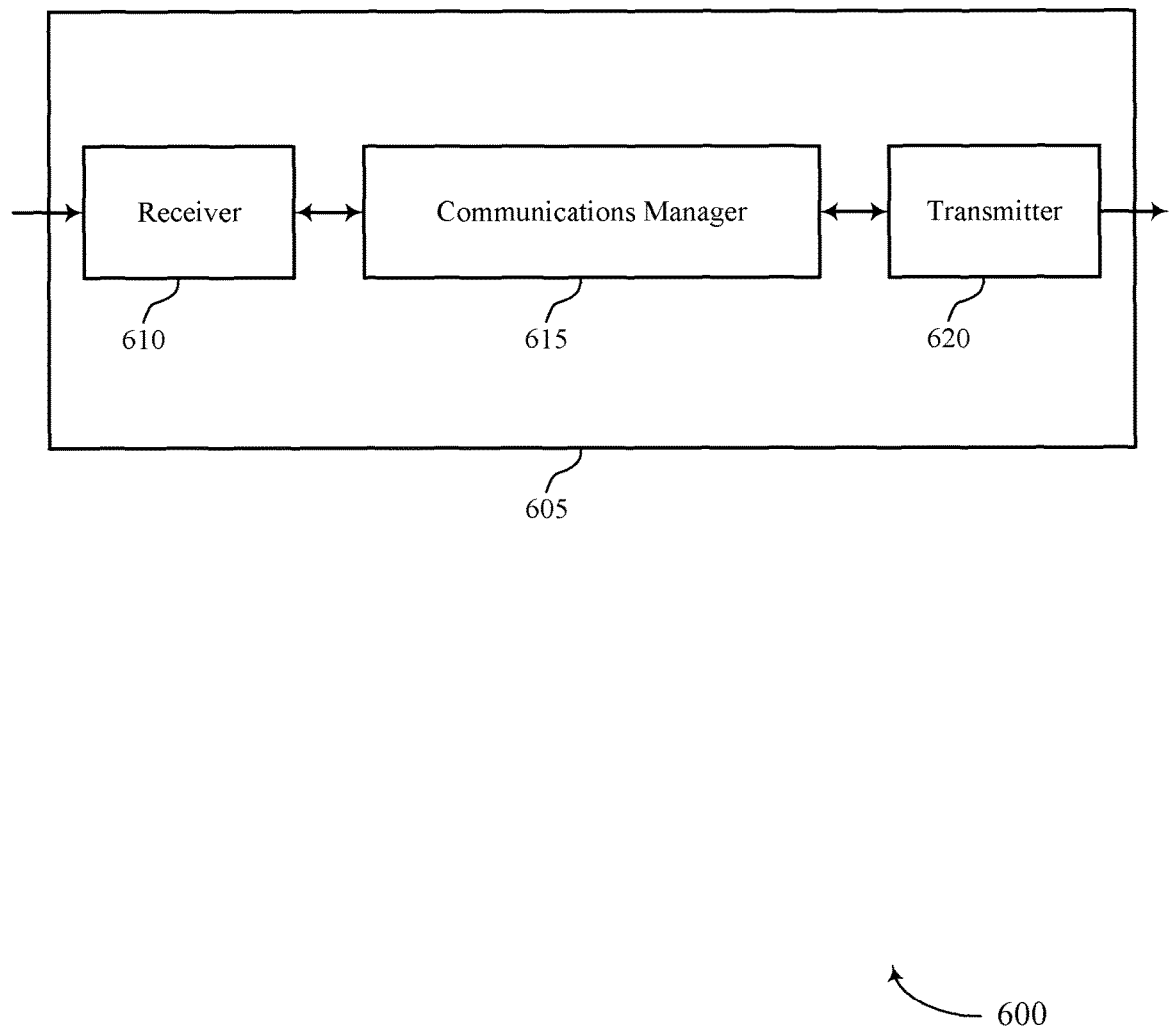
FIGS. 6 and 7 show block diagrams of devices that support rate matching and semi persistent scheduling configuration in wireless communications in accordance with aspects of the present disclosure.

FIG. 6 shows a block diagram 600 of a device 605 that supports rate matching and semi persistent scheduling configuration in wireless communications in accordance with aspects of the present disclosure. The device 605 may be an example of aspects of a UE 115 as described herein. The device 605 may include a receiver 610, a communications manager 615, and a transmitter 620. Device 605 may also include one or more processors, memory coupled with the one or more processors, and instructions stored in the memory that are executable by the one or more processors to enable the one or more processors to perform the rate matching and semi persistent scheduling configuration features discussed herein. Each of these components may be in communication with one another (e.g., via one or more buses).

The receiver 610 may receive information such as packets, user data, or control information associated with various information channels (e.g., control channels, data channels, and information related to rate matching and semi persistent scheduling configuration in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a channel quality indication (CQI) table that provides one or more parameters associated with one or more modulation orders for transmissions between the UE and a base station, receive control information for a downlink transmission, the control information including a first index value for a first entry in an MCS table, where the first entry in the MCS table indicates a first modulation order independently of the one or more modulation orders of the CQI table, and determine a rate matching parameter for the downlink transmission based on at least one of the first modulation order or the CQI table. The communications manager 615 may also receive, from a base station, a SPS configuration, decode control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determine whether SPS communications are activated based on the decoding. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
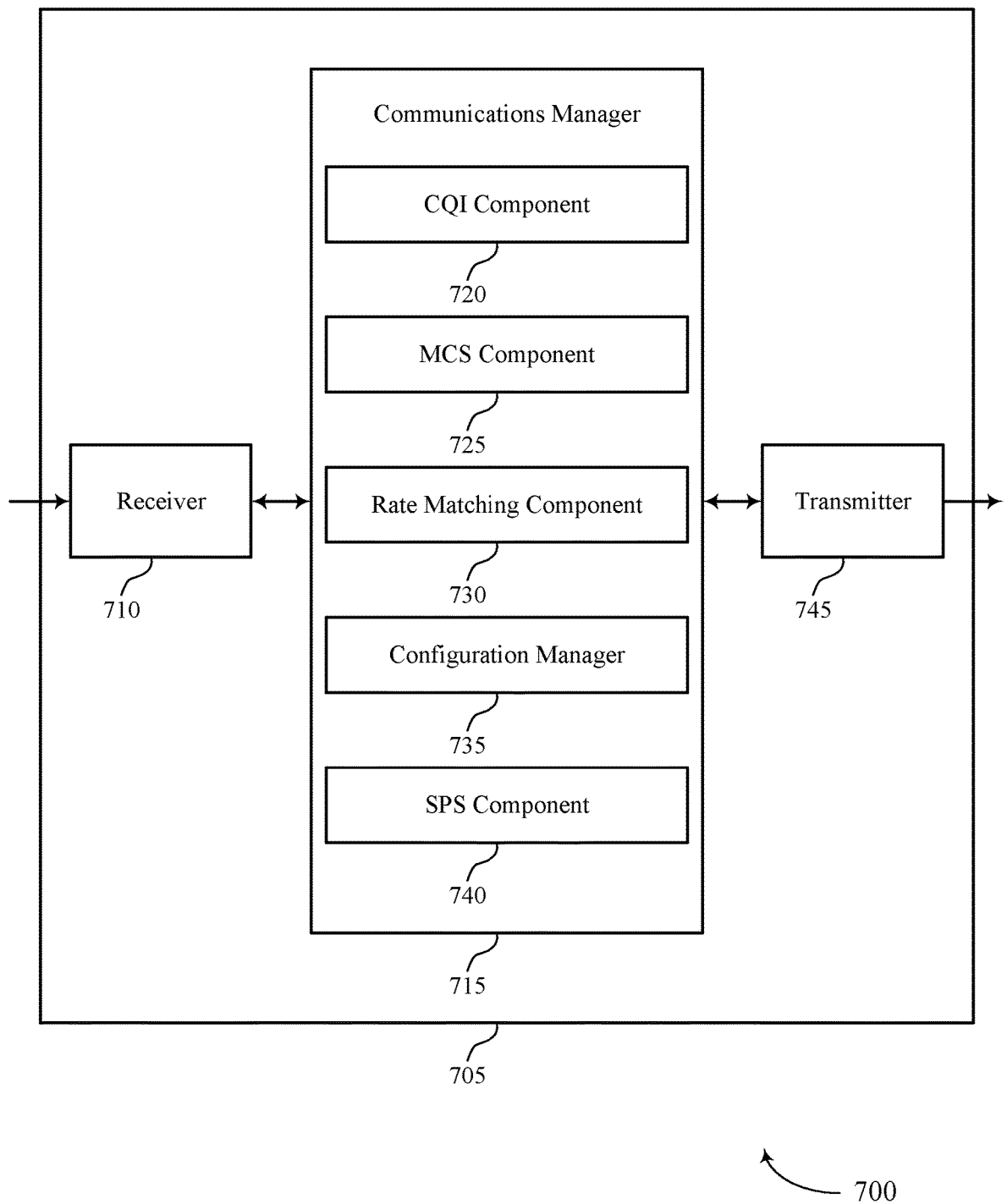

FIG. 7 shows a block diagram 700 of a device 705 that supports rate matching and semi persistent scheduling configuration in wireless communications in accordance with aspects of the present disclosure. The device 705 may be an example of aspects of a device 605 or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to rate matching and semi persistent scheduling configuration in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CQI component 720, an MCS component 725, a rate matching component 730, a configuration manager 735, and a SPS component 740. The communications manager 715 may be an example of aspects of the communications manager 910 described herein.

The CQI component 720 may identify a CQI table that provides one or more parameters associated with one or more modulation orders for transmissions between the UE and a base station.

The MCS component 725 may receive, from the base station, control information for a downlink transmission, the control information including a first index value for a first entry in an MCS table, where the first entry in the MCS table indicates a first modulation order independently of the one or more modulation orders of the CQI table.

The rate matching component 730 may determine a rate matching parameter for the downlink transmission based on at least one of the first modulation order or the CQI table.

The configuration manager 735 may receive, from a base station, a SPS configuration, may decode control information from the base station based on the SPS configuration, and may determine whether SPS communications are activated based on the decoding. In some cases, the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
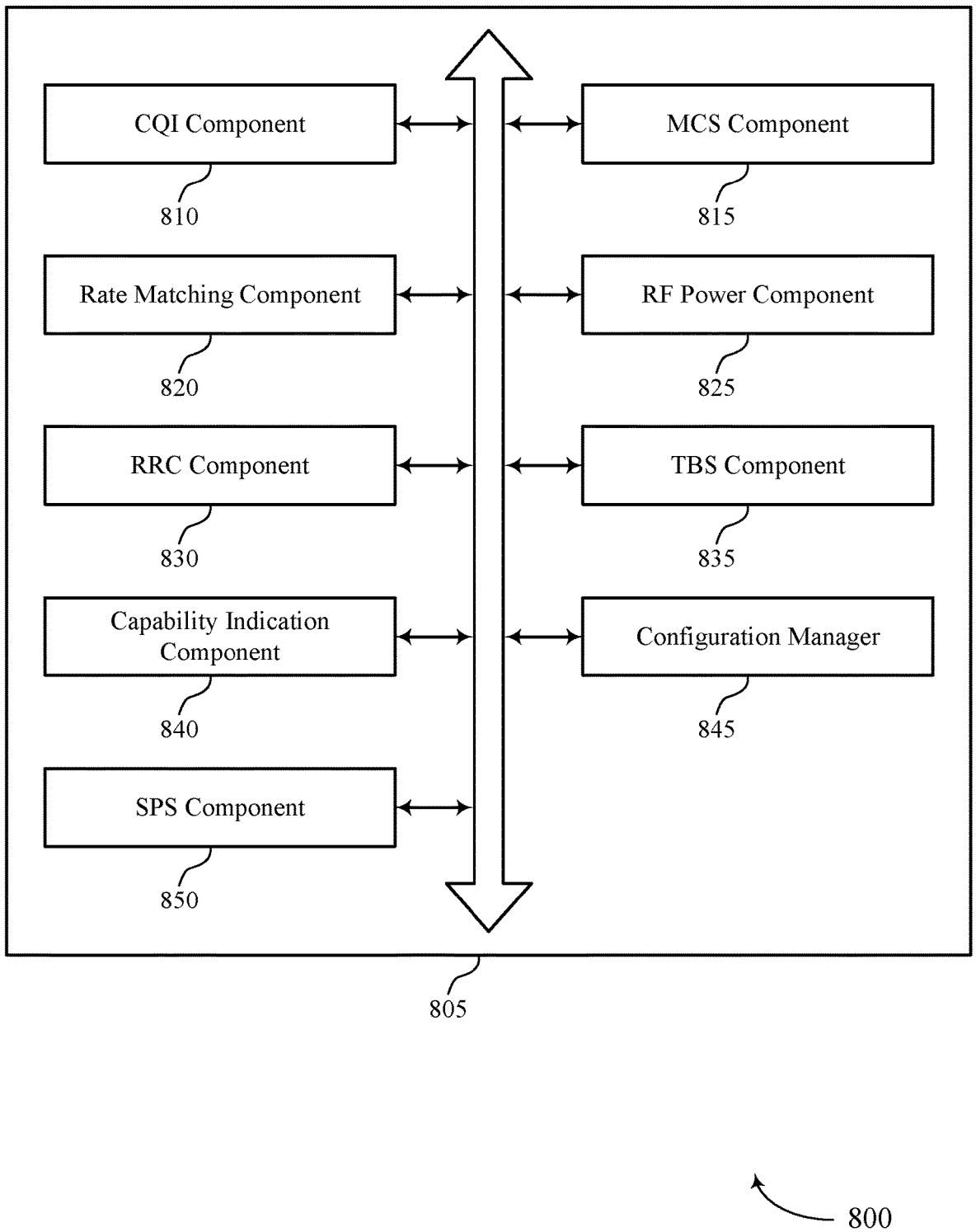
FIG. 8 shows a block diagram of a communications manager that supports rate matching and semi persistent scheduling configuration in wireless communications in accordance with aspects of the present disclosure.

FIG. 8 shows a block diagram 800 of a communications manager 805 that supports rate matching and semi persistent scheduling configuration in wireless communications in accordance with aspects of the present disclosure. The communications manager 805 may be an example of aspects of a communications manager 615, a communications manager 715, or a communications manager 910 described herein. The communications manager 805 may include a CQI component 810, an MCS component 815, a rate matching component 820, a RF power component 825, an RRC component 830, a transport block size component 835, a capability indication component 840, a configuration manager 845, and a SPS component 850. Each of these modules may communicate, directly or indirectly, with one another (e.g., via one or more buses).

The CQI component 810 may identify a CQI table that provides one or more parameters associated with one or more modulation orders for transmissions between the UE and a base station.

The MCS component 815 may receive, from the base station, control information for a downlink transmission, the control information including a first index value for a first entry in an MCS table, where the first entry in the MCS table indicates a first modulation order independently of the one or more modulation orders of the CQI table. In some examples, the MCS component 815 may discard the control information when the first modulation order exceeds a maximum modulation order of the one or more modulation orders of the CQI table. In other examples, the MCS component 815 may determine that the first modulation order exceeds a maximum modulation order of the one or more modulation orders of the CQI table, and may determine the rate matching parameter based on a highest entry in the MCS table that has a modulation order that is supported by the UE. In some cases, the rate matching parameter is based on a highest supported modulation order supported by the UE for a radio frequency band or band combination used for the downlink transmission.

In some examples, the MCS component 815 may receive, from the base station, second control information for a second downlink transmission, the second control information including a second index value for a second entry in the MCS table. In some examples, the MCS component 815 may receive the second downlink transmission based on the first modulation order and the determined rate matching parameter.

In some examples, the base station may be provided with a capability indication that indicates that a higher modulation order may be transmitted, and the MCS component 815 may receive, responsive to the capability indication, a modulation order indication that indicates that the base station will transmit one or more downlink transmissions having a modulation order that exceeds the maximum modulation order indicated by the CQI table.

In some examples, the MCS component 815 may process the control information based on the modulation order indication. For example, if the CQI table is 256QAM and the UE is not configured to receive transmissions with a modulation order that exceeds the highest modulation order to the CQI table, the UE will discard control information with entries for 1024QAM.

The rate matching component 820 may determine a rate matching parameter for the downlink transmission based on at least one of the first modulation order or the CQI table. In some examples, the rate matching component 820 may receive the first downlink transmission based on the determined rate matching parameter and the first modulation order.

The configuration manager 845 may receive, from a base station, one or more configuration parameters, such as a CQI table configuration, a SPS configuration, or combinations thereof.

The SPS component 850 may decode control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM. In some examples, the SPS component 850 may determine whether SPS communications are activated based on the decoding. In some examples, the MCS field is a six-bit MCS field, and a subset of bits of the six-bit MCS field are used for the first interpretation. In some examples, retransmissions of information in the MCS field are disallowed for the first interpretation.

In some examples, the SPS component 850 may determine that one or more fields in the control information are set to predetermined values that indicate that SPS communications are activated, the one or more fields including the MCS field in which two most significant bits set to zero indicates SPS communications are activated. In some examples, second control information from the base station may be decoded that indicates that SPS communications are deactivated, where the MCS field of the second control information includes a six-bit field in which each bit is set to one, and the SPS component 850 may discontinue the SPS communications. In some cases, the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries. In some cases, the second subset of entries include one or more entries of the MCS table that indicate scaling parameters, one or more entries indicating a modulation order that exceeds a 64 QAM modulation order, one or more entries for retransmissions of MCS, or any combinations thereof.

The RF power component 825 may set a power of receive circuitry based on the maximum modulation order of the one or more modulation orders of the CQI table. In some examples, the RF power component 825 may select an operating power for one or more receive components of the UE based on the modulation order indication.

The RRC component 830 may receive RRC signaling that includes a signaled modulation order that is different than a modulation order indicated in the first entry in the MCS table.

The transport block size component 835 may determine a first transport block size for the downlink transmission based on the first modulation order. In some examples, the transport block size component 835 may compare the first transport block size to a maximum transport block size that is identified based on a maximum modulation order of the one or more modulation orders of the CQI table. In some examples, the transport block size component 835 may receive the downlink transmission when the first transport block size is less than or equal to the maximum transport block size. In some examples, the transport block size component 835 may discard the control information when the first transport block size exceeds the maximum transport block size.

The capability indication component 840 may transmit, to the base station, a capability indication that indicates the UE is capable of operating at a modulation order that exceeds the maximum modulation order indicated by the CQI table.

Figure 9:
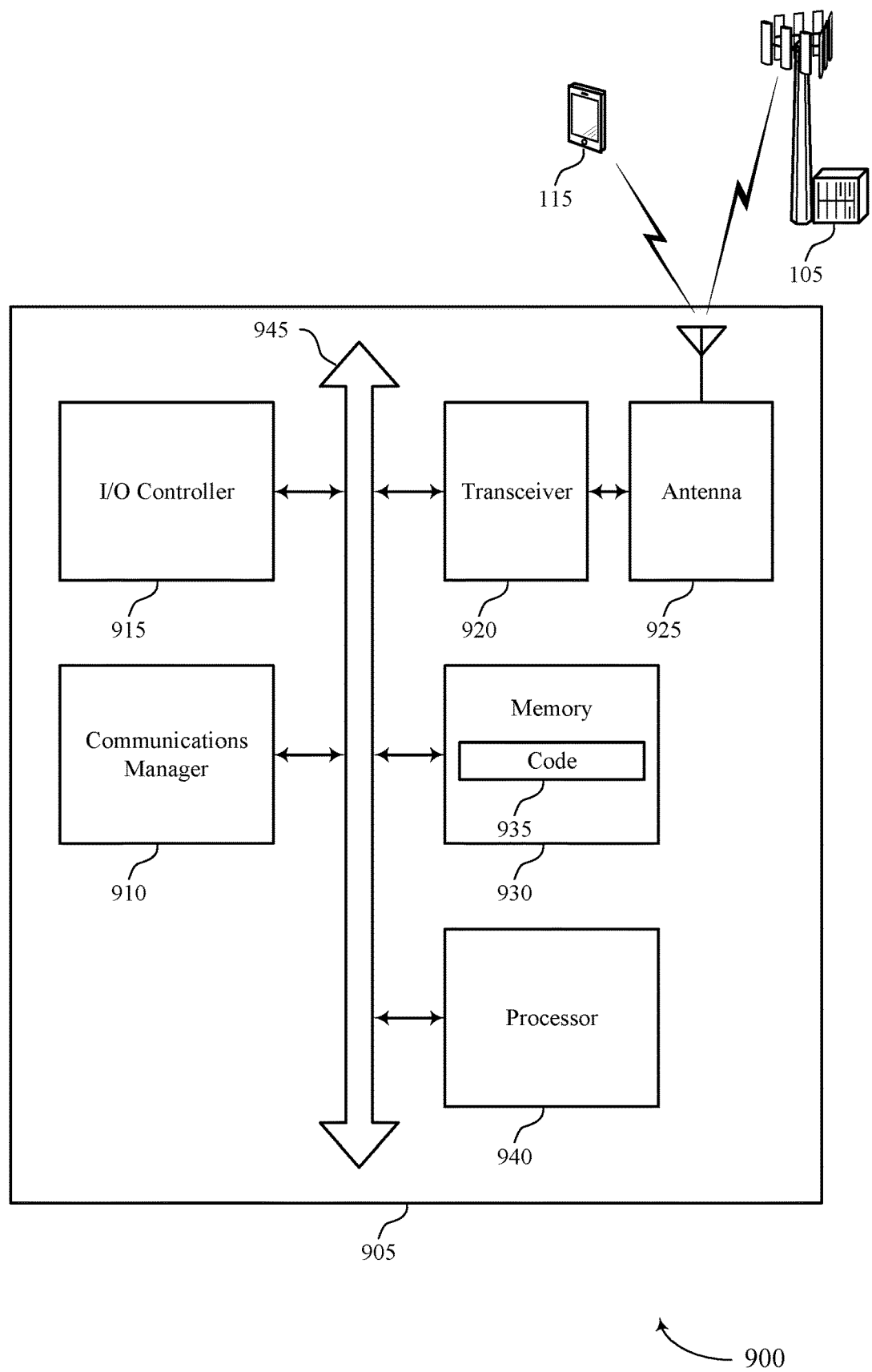
FIG. 9 shows a diagram of a system including a device that supports rate matching and semi persistent scheduling configuration in wireless communications in accordance with aspects of the present disclosure.

FIG. 9 shows a diagram of a system 900 including a device 905 that supports rate matching and semi persistent scheduling configuration in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a CQI table that provides one or more parameters associated with one or more modulation orders for transmissions between the UE and a base station, receive, from the base station, control information for a downlink transmission, the control information including a first index value for a first entry in an MCS table, where the first entry in the MCS table indicates a first modulation order independently of the one or more modulation orders of the CQI table, and determine a rate matching parameter for the downlink transmission based on at least one of the first modulation order or the CQI table. The communications manager 910 may also receive, from a base station, a SPS configuration, decode control information from the base station based on the SPS configuration, where the control information includes an MCS field that is decoded according to a first interpretation when the control information is for SPS communications and according to a second interpretation when the control information is for non-SPS communications, and where the MCS field according to the second interpretation is capable of signaling a modulation order that exceeds 256QAM, and determine whether SPS communications are activated based on the decoding.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting rate matching and semi persistent scheduling configuration in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
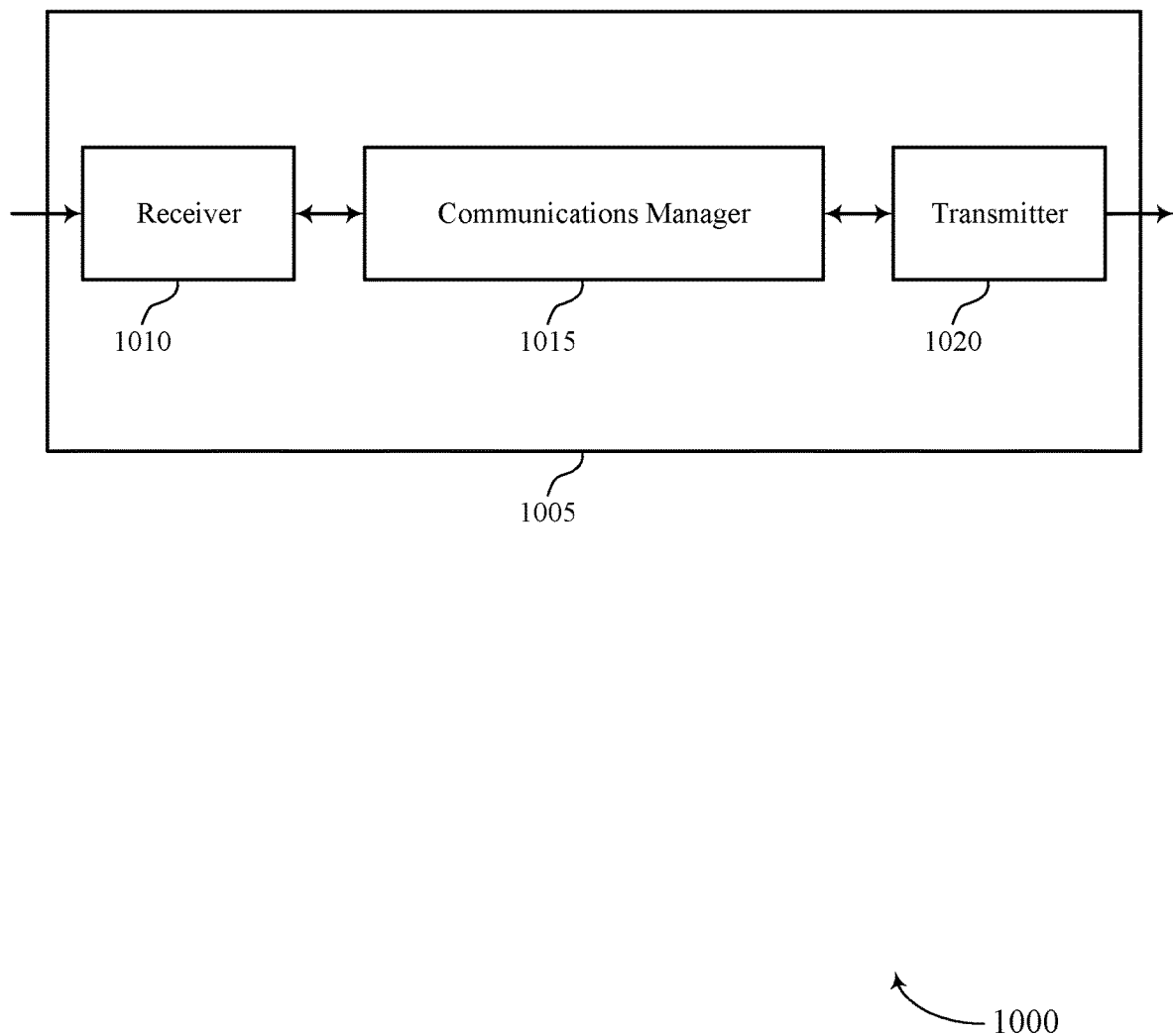
FIGS. 10 and 11 show block diagrams of devices that support rate matching and semi persistent scheduling configuration in wireless communications in accordance with aspects of the present disclosure.

FIG. 10 shows a block diagram 1000 of a device 1005 that supports rate matching and semi persistent scheduling configuration in wireless communications in accordance with aspects of the present disclosure. The device 1005 may be an example of aspects of a base station 105 as described herein. The device 1005 may include a receiver 1010, a communications manager 1015, and a transmitter 1020. Device 1005 may also include one or more processors, memory coupled with the one or more processors, and instructions stored in the memory that are executable by the one or more processors to enable the one or more processors to perform the rate matching and semi persistent scheduling configuration features discussed herein. Each of these components may be in communication with one another (e.g., via one or more buses).

The receiver 1010 may receive information such as packets, user data, or control information associated with various information channels (e.g., control channels, data channels, and information related to rate matching and semi persistent scheduling configuration in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a CQI table that provides one or more parameters associated with one or more modulation orders for transmissions between the base station and a UE, transmit, to the UE, control information for a downlink transmission, the control information including a first index value for a first entry in an MCS table, where the first entry in the MCS table indicates a first modulation order independently of the one or more modulation orders of the CQI table, and transmit the downlink transmission to the UE using the first modulation order. The communications manager 1015 may also configure a UE with a SPS configuration, determine to activate SPS communications with the UE according to the SPS configuration, format control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmit the control information to the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
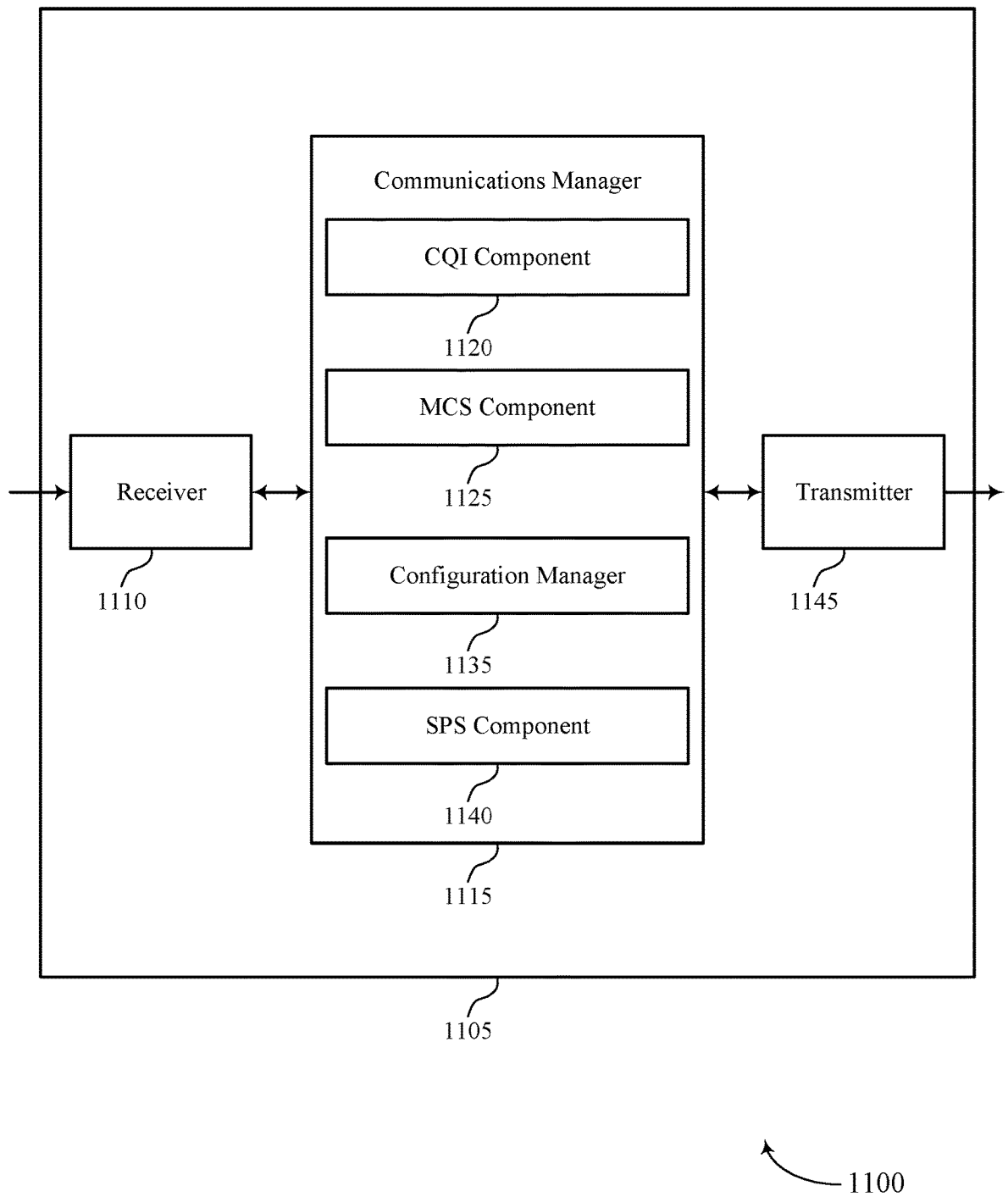

FIG. 11 shows a block diagram 1100 of a device 1105 that supports rate matching and semi persistent scheduling configuration in wireless communications in accordance with aspects of the present disclosure. The device 1105 may be an example of aspects of a device 1005 or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to rate matching and semi persistent scheduling configuration in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CQI component 1120, an MCS component 1125, a configuration manager 1135, and a SPS component 1140. The communications manager 1115 may be an example of aspects of the communications manager 1310 described herein.

The CQI component 1120 may identify a CQI table that provides one or more parameters associated with one or more modulation orders for transmissions between the base station and a UE.

The MCS component 1125 may transmit, to the UE, control information for a downlink transmission, the control information including a first index value for a first entry in an MCS table, where the first entry in the MCS table indicates a first modulation order independently of the one or more modulation orders of the CQI table.

The configuration manager 1135 may configure a UE with a SPS configuration.

The SPS component 1140 may determine to activate SPS communications with the UE according to the SPS configuration and format control information to activate the SPS communications, where the control information includes a modulation and coding scheme (MCS) field that is formatted according to a first interpretation when the control information is for SPS communications and according to a second interpretation when the control information is for non-SPS communications, and where the MCS field according to the second interpretation is capable of signaling a modulation order that exceeds 256QAM.

The transmitter 1145 may transmit the control information to the UE. The transmitter 1145 may also transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
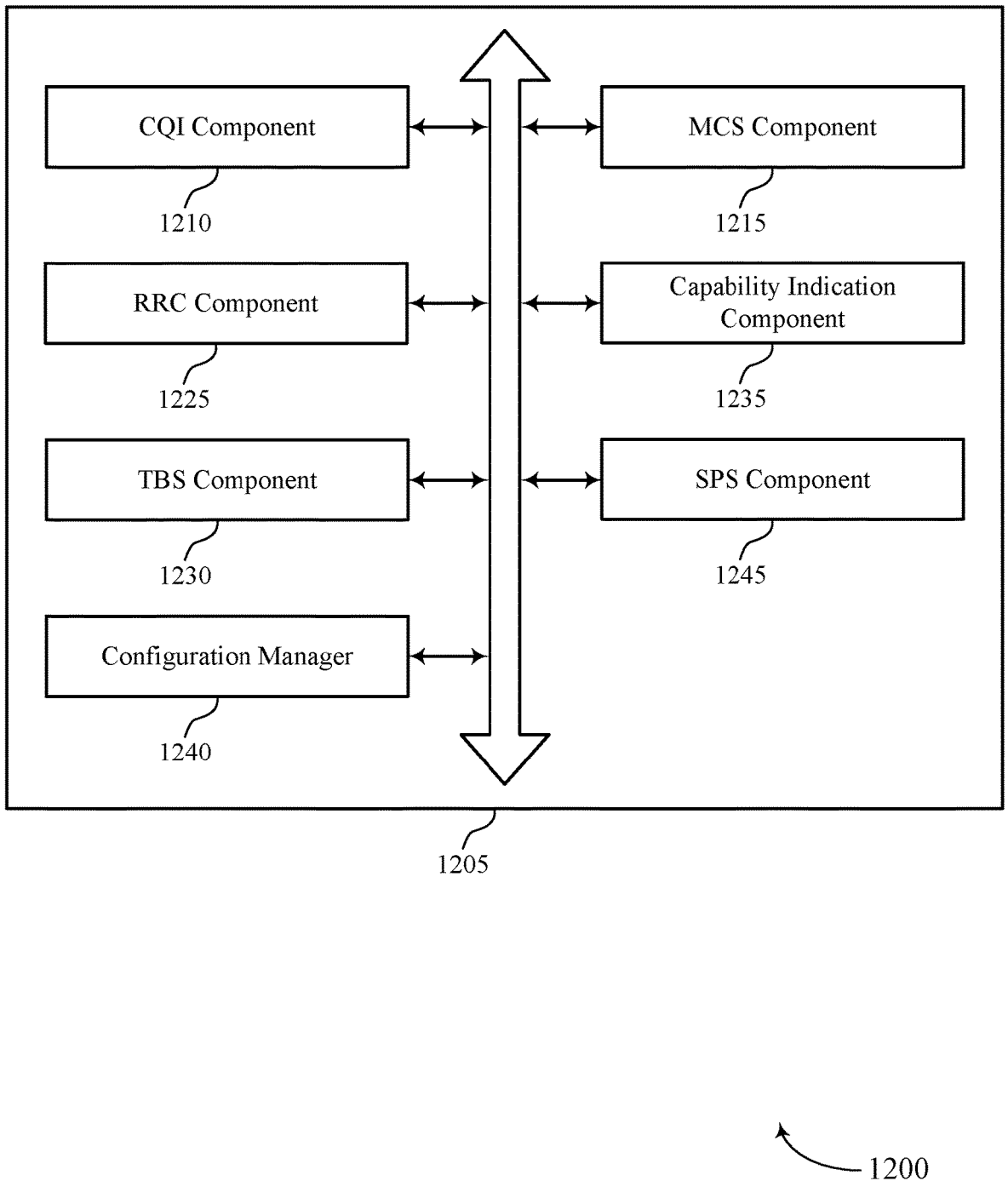
FIG. 12 shows a block diagram of a communications manager that supports rate matching and semi persistent scheduling configuration in wireless communications in accordance with aspects of the present disclosure.

FIG. 12 shows a block diagram 1200 of a communications manager 1205 that supports rate matching and semi persistent scheduling configuration in wireless communications in accordance with aspects of the present disclosure. The communications manager 1205 may be an example of aspects of a communications manager 1015, a communications manager 1115, or a communications manager 1310 described herein. The communications manager 1205 may include a CQI component 1210, an MCS component 1215, an RRC component 1225, a transport block size component 1230, a capability indication component 1235, a configuration manager 1240, and a SPS component 1245. Each of these modules may communicate, directly or indirectly, with one another (e.g., via one or more buses).

The CQI component 1210 may identify a CQI table that provides one or more parameters associated with one or more modulation orders for transmissions between the base station and a UE.

The MCS component 1215 may transmit, to the UE, control information for a downlink transmission, the control information including a first index value for a first entry in an MCS table, where the first entry in the MCS table indicates a first modulation order independently of the one or more modulation orders of the CQI table. In some examples, the MCS component 1215 may determine a highest modulation order supported by the UE for a radio frequency band or band combination to be used for the downlink transmission. In some examples, the MCS component 1215 may select a first modulation order as the highest modulation order, where the first modulation order corresponds to or exceeds a maximum modulation order of the one or more modulation orders of the CQI table. In some examples, the MCS component 1215 may transmit the downlink transmission using the highest modulation order supported by the UE.

In some examples, the MCS component 1215 may transmit, to the UE, second control information for a second downlink transmission, the second control information including a second index value for a second entry in the MCS table. In some examples, the MCS component 1215 may transmit the second downlink transmission using the first modulation order. In some cases, the first index value is a six-bit index value that identifies the first entry from 64 available entries of the MCS table. In some cases, the first modulation order is selected to be at or below a maximum modulation order of the one or more modulation orders of the CQI table.

The configuration manager 1240 may configure a UE with a SPS configuration.

The SPS component 1245 may determine to activate SPS communications with the UE according to the SPS configuration. In some examples, the SPS component 1245 may format control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM. In some examples, the SPS component 1245 may where the MCS field is a six-bit MCS field, and a subset of bits of the six-bit MCS field are used for the first interpretation. In some examples, the SPS component 1245 may set two most significant bits of the MCS field to zero for the first interpretation. In some examples, retransmissions of information in the MCS field are disallowed for the first interpretation. In some examples, the SPS component 1245 may set one or more fields in the control information to predetermined values that indicate that SPS is activated, the one or more fields including the MCS field in which two most significant bits are set to zero to indicate SPS communications are activated. In some examples, the SPS component 1245 may communicate with the UE using SPS transmissions.

In some examples, the SPS component 1245 may determine to deactivate the SPS communications. In some examples, the SPS component 1245 may format second control information that indicates that SPS communications are deactivated, where the MCS field of the second control information includes a six-bit field in which each bit is set to one. In some examples, the SPS component 1245 may transmit the second control information to the UE, and may discontinue the SPS communications.

In some cases, the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries. In some cases, the second subset of entries include one or more entries of the MCS table that indicate scaling parameters, one or more entries indicating a modulation order that exceeds a 64 QAM modulation order, one or more entries for retransmissions of MCS, or any combinations thereof.

The RRC component 1225 may transmit RRC signaling that includes a signaled modulation order that is different than a modulation order indicated in the first entry in the MCS table.

The transport block size component 1230 may determine a first transport block size for the downlink transmission that is less than or equal to a maximum transport block size that is identified based on a maximum modulation order of the one or more modulation orders of the CQI table, and where the downlink transmission uses the first transport block size.

The capability indication component 1235 may receive, from the UE, a capability indication that indicates the UE is capable of operating at a modulation order that exceeds the maximum modulation order indicated by the CQI table. In some examples, the capability indication component 1235 may transmit, responsive to the capability indication, a modulation order indication that indicates that the base station will transmit one or more downlink transmissions having a modulation order that exceeds the maximum modulation order indicated by the CQI table.

Figure 13:
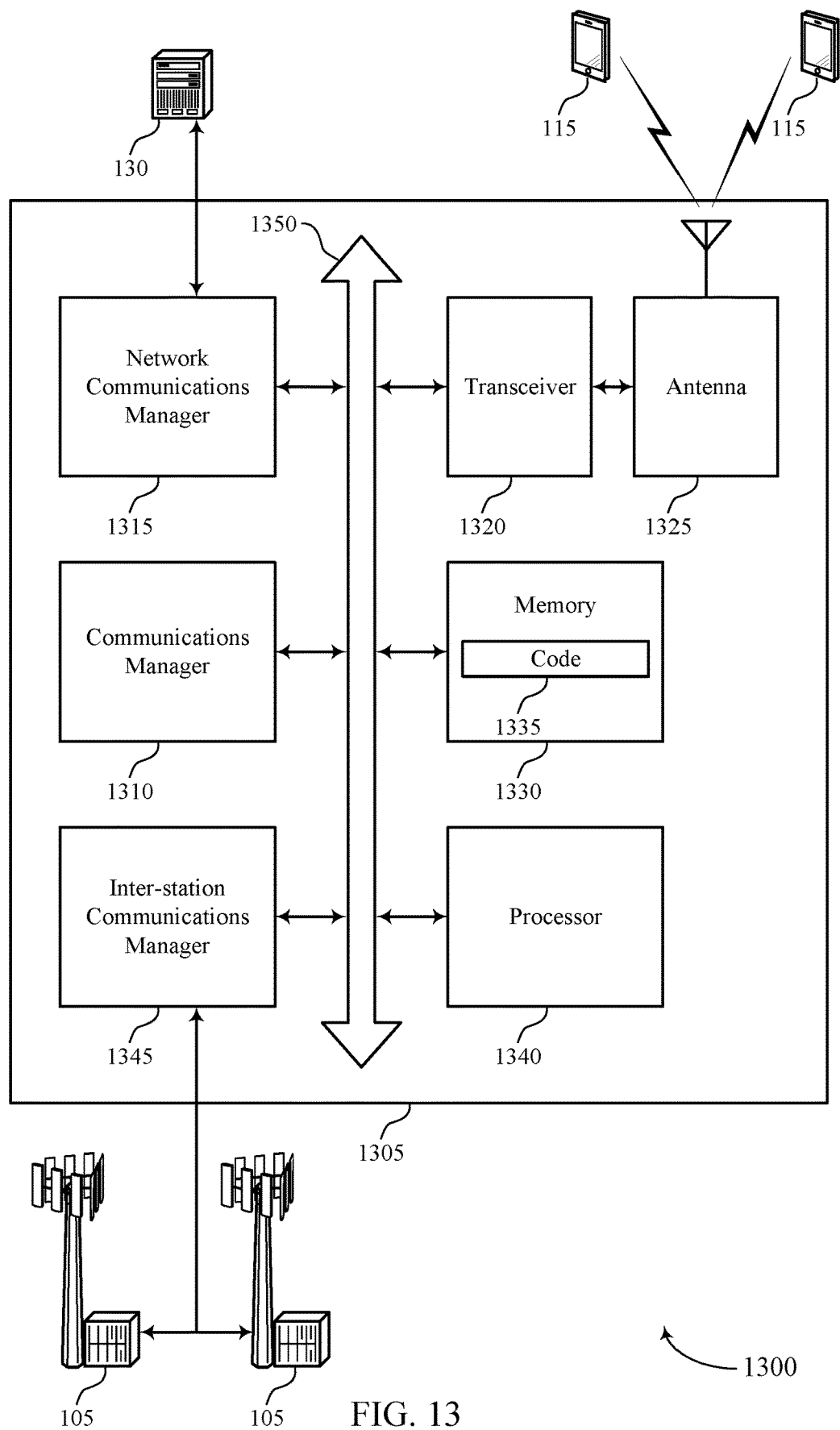
FIG. 13 shows a diagram of a system including a device that supports rate matching and semi persistent scheduling configuration in wireless communications in accordance with aspects of the present disclosure.

FIG. 13 shows a diagram of a system 1300 including a device 1305 that supports rate matching and semi persistent scheduling configuration in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a CQI table that provides one or more parameters associated with one or more modulation orders for transmissions between the base station and a UE, transmit, to the UE, control information for a downlink transmission, the control information including a first index value for a first entry in an MCS table, where the first entry in the MCS table indicates a first modulation order independently of the one or more modulation orders of the CQI table, and transmit the downlink transmission to the UE using the first modulation order. The communications manager 1310 may also configure a UE with a SPS configuration, determine to activate SPS communications with the UE according to the SPS configuration, format control information to activate the SPS communications, where the control information includes an MCS field that is formatted according to a first interpretation when the control information is for SPS communications and according to a second interpretation when the control information is for non-SPS communications, and where the MCS field according to the second interpretation is capable of signaling a modulation order that exceeds 256QAM, and transmit the control information to the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting rate matching and semi persistent scheduling configuration in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
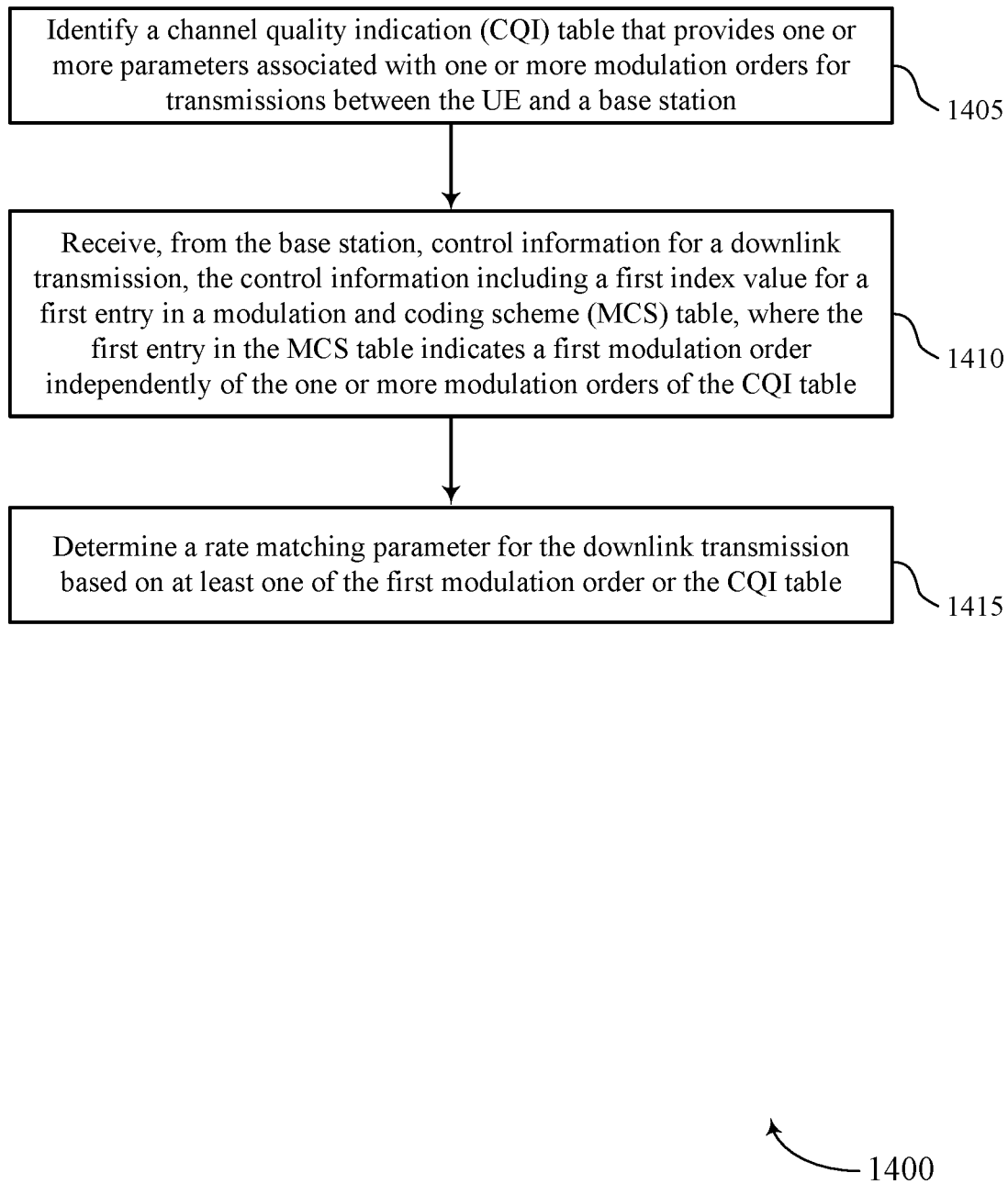
FIGS. 14 through 23 show flowcharts illustrating methods that support rate matching and semi persistent scheduling configuration in wireless communications in accordance with aspects of the present disclosure.

FIG. 14 shows a flowchart illustrating a method 1400 that supports rate matching and semi persistent scheduling configuration in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may identify a CQI table that provides one or more parameters associated with one or more modulation orders for transmissions between the UE and a base station. The operations of 1405 may be performed according to the methods described herein. In some examples, aspects of the operations of 1405 may be performed by a CQI component as described with reference to FIGS. 6 through 9.

At 1410, the UE may receive, from the base station, control information for a downlink transmission, the control information including a first index value for a first entry in an MCS table, where the first entry in the MCS table indicates a first modulation order independently of the one or more modulation orders of the CQI table. The operations of 1410 may be performed according to the methods described herein. In some examples, aspects of the operations of 1410 may be performed by an MCS component as described with reference to FIGS. 6 through 9. In some cases, the first index value is a six-bit index value that identifies the first entry from 64 available entries of the MCS table.

Figure 15:
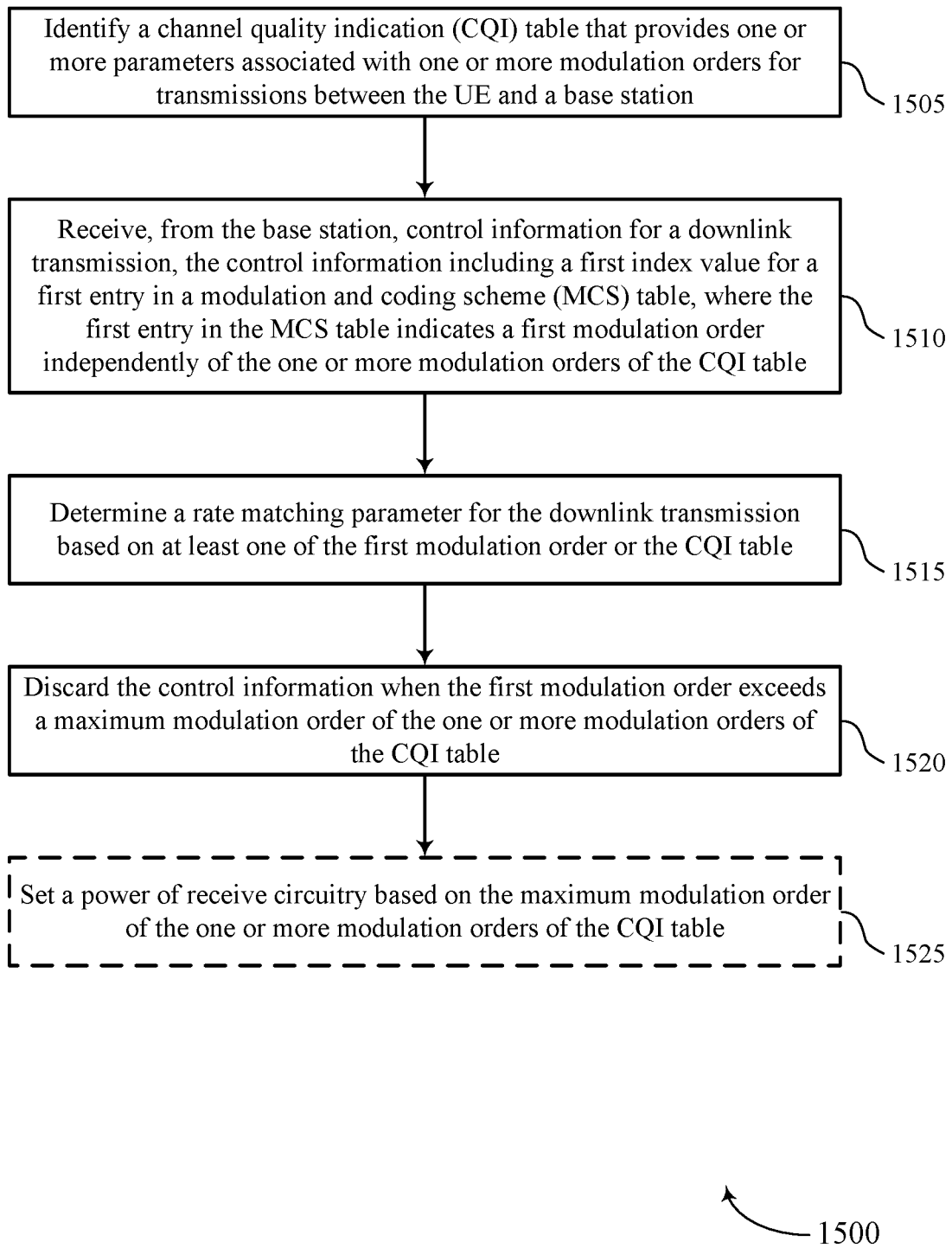

At 1415, the UE may determine a rate matching parameter for the downlink transmission based on at least one of the first modulation order or the CQI table. The operations of 1415 may be performed according to the methods described herein. In some examples, aspects of the operations of 1415 may be performed by a rate matching component as described with reference to FIGS. 6 through 9. In some cases, the UE may determine that the first modulation order exceeds a maximum modulation order of the one or more modulation orders of the CQI table, and may determine the rate matching parameter based on a highest entry in the MCS table that has a modulation order that is supported by the UE. In some cases, the rate matching parameter is based on a highest supported modulation order supported by the UE for a radio frequency band or band combination used for the downlink transmission FIG. 15 shows a flowchart illustrating a method 1500 that supports rate matching and semi persistent scheduling configuration in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may identify a channel quality indication (CQI) table that provides one or more parameters associated with one or more modulation orders for transmissions between the UE and a base station. The operations of 1505 may be performed according to the methods described herein. In some examples, aspects of the operations of 1505 may be performed by a CQI component as described with reference to FIGS. 6 through 9.

At 1510, the UE may receive, from the base station, control information for a downlink transmission, the control information including a first index value for a first entry in a modulation and coding scheme (MCS) table, where the first entry in the MCS table indicates a first modulation order independently of the one or more modulation orders of the CQI table. The operations of 1510 may be performed according to the methods described herein. In some examples, aspects of the operations of 1510 may be performed by an MCS component as described with reference to FIGS. 6 through 9.

At 1515, the UE may determine a rate matching parameter for the downlink transmission based on at least one of the first modulation order or the CQI table. The operations of 1515 may be performed according to the methods described herein. In some examples, aspects of the operations of 1515 may be performed by a rate matching component as described with reference to FIGS. 6 through 9.

At 1520, the UE may discard the control information when the first modulation order exceeds a maximum modulation order of the one or more modulation orders of the CQI table. The operations of 1520 may be performed according to the methods described herein. In some examples, aspects of the operations of 1520 may be performed by an MCS component as described with reference to FIGS. 6 through 9.

At 1525, the UE may optionally set a power of receive circuitry based on the maximum modulation order of the one or more modulation orders of the CQI table. The operations of 1525 may be performed according to the methods described herein. In some examples, aspects of the operations of 1525 may be performed by a RF power component as described with reference to FIGS. 6 through 9.

Figure 16:
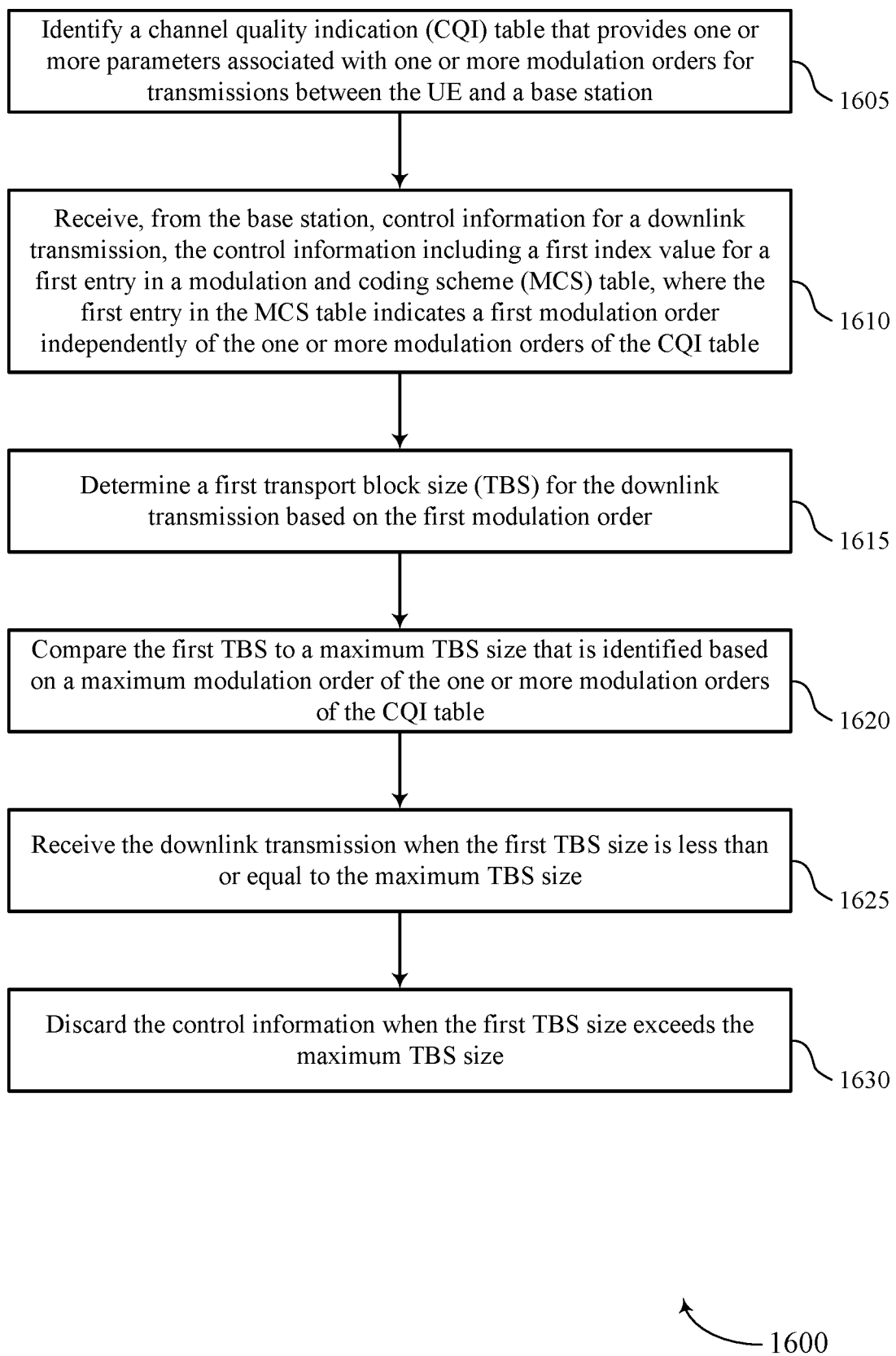

FIG. 16 shows a flowchart illustrating a method 1600 that supports rate matching and semi persistent scheduling configuration in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the UE may identify a channel quality indication (CQI) table that provides one or more parameters associated with one or more modulation orders for transmissions between the UE and a base station. The operations of 1605 may be performed according to the methods described herein. In some examples, aspects of the operations of 1605 may be performed by a CQI component as described with reference to FIGS. 6 through 9.

At 1610, the UE may receive, from the base station, control information for a downlink transmission, the control information including a first index value for a first entry in a modulation and coding scheme (MCS) table, where the first entry in the MCS table indicates a first modulation order independently of the one or more modulation orders of the CQI table. The operations of 1610 may be performed according to the methods described herein. In some examples, aspects of the operations of 1610 may be performed by an MCS component as described with reference to FIGS. 6 through 9.

At 1615, the UE may determine a first transport block size for the downlink transmission based on the first modulation order. The operations of 1615 may be performed according to the methods described herein. In some examples, aspects of the operations of 1615 may be performed by a transport block size component as described with reference to FIGS. 6 through 9.

At 1620, the UE may compare the first transport block size to a maximum transport block size that is identified based on a maximum modulation order of the one or more modulation orders of the CQI table. The operations of 1620 may be performed according to the methods described herein. In some examples, aspects of the operations of 1620 may be performed by a transport block size component as described with reference to FIGS. 6 through 9.

At 1625, the UE may receive the downlink transmission when the first transport block size is less than or equal to the maximum transport block size. The operations of 1625 may be performed according to the methods described herein. In some examples, aspects of the operations of 1625 may be performed by a transport block size component as described with reference to FIGS. 6 through 9.

At 1630, the UE may discard the control information when the first transport block size exceeds the maximum transport block size. The operations of 1630 may be performed according to the methods described herein. In some examples, aspects of the operations of 1630 may be performed by a transport block size component as described with reference to FIGS. 6 through 9.

Figure 17:
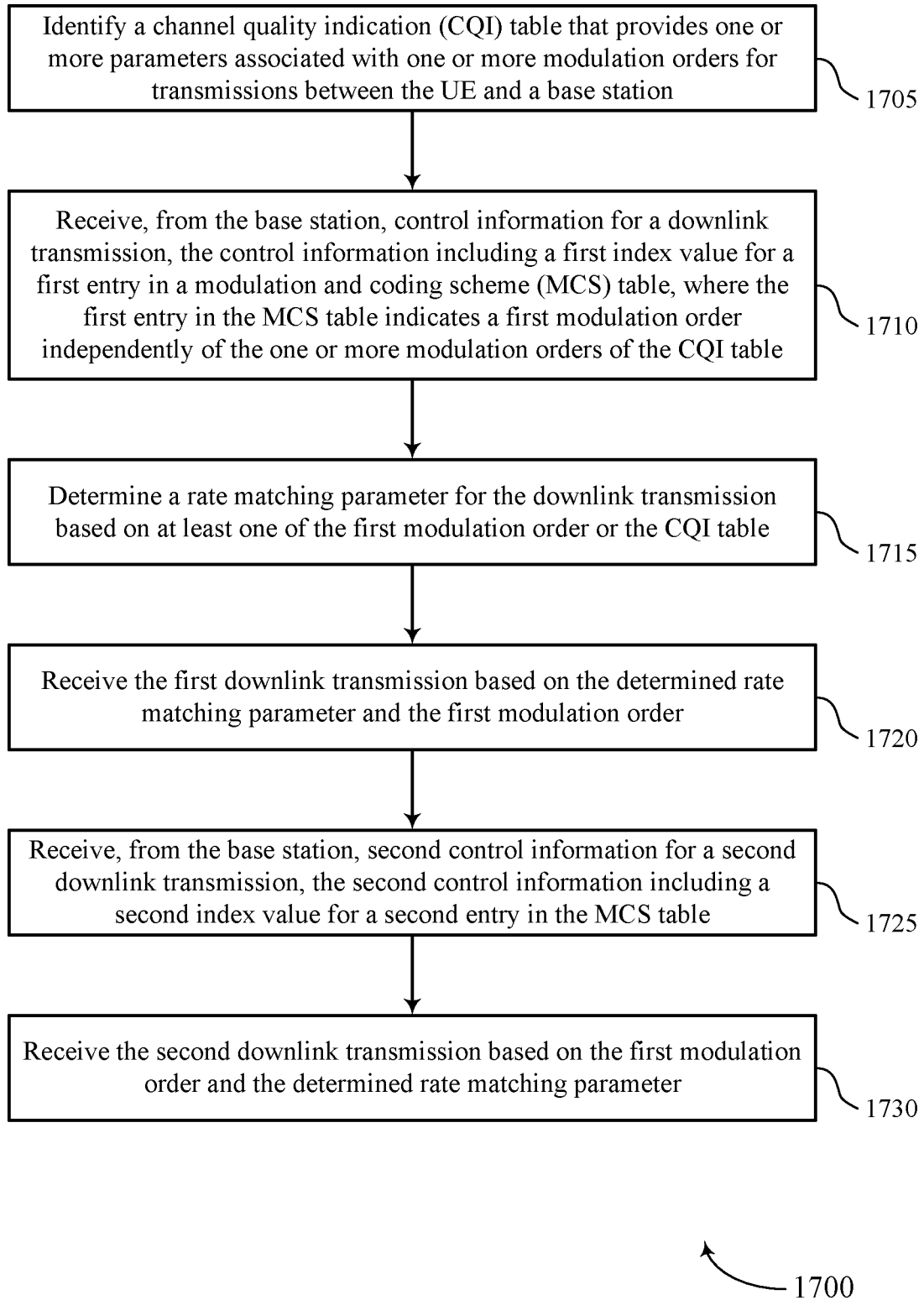

FIG. 17 shows a flowchart illustrating a method 1700 that supports rate matching and semi persistent scheduling configuration in wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1705, the UE may identify a channel quality indication (CQI) table that provides one or more parameters associated with one or more modulation orders for transmissions between the UE and a base station. The operations of 1705 may be performed according to the methods described herein. In some examples, aspects of the operations of 1705 may be performed by a CQI component as described with reference to FIGS. 6 through 9.

At 1710, the UE may receive, from the base station, control information for a downlink transmission, the control information including a first index value for a first entry in a modulation and coding scheme (MCS) table, where the first entry in the MCS table indicates a first modulation order independently of the one or more modulation orders of the CQI table. The operations of 1710 may be performed according to the methods described herein. In some examples, aspects of the operations of 1710 may be performed by an MCS component as described with reference to FIGS. 6 through 9.

At 1715, the UE may determine a rate matching parameter for the downlink transmission based on at least one of the first modulation order or the CQI table. The operations of 1715 may be performed according to the methods described herein. In some examples, aspects of the operations of 1715 may be performed by a rate matching component as described with reference to FIGS. 6 through 9.

At 1720, the UE may receive the first downlink transmission based on the determined rate matching parameter and the first modulation order. The operations of 1720 may be performed according to the methods described herein. In some examples, aspects of the operations of 1720 may be performed by a rate matching component as described with reference to FIGS. 6 through 9.

At 1725, the UE may receive, from the base station, second control information for a second downlink transmission, the second control information including a second index value for a second entry in the MCS table. The operations of 1725 may be performed according to the methods described herein. In some examples, aspects of the operations of 1725 may be performed by an MCS component as described with reference to FIGS. 6 through 9.

At 1730, the UE may receive the second downlink transmission based on the first modulation order and the determined rate matching parameter. The operations of 1730 may be performed according to the methods described herein. In some examples, aspects of the operations of 1730 may be performed by an MCS component as described with reference to FIGS. 6 through 9.

Figure 18:
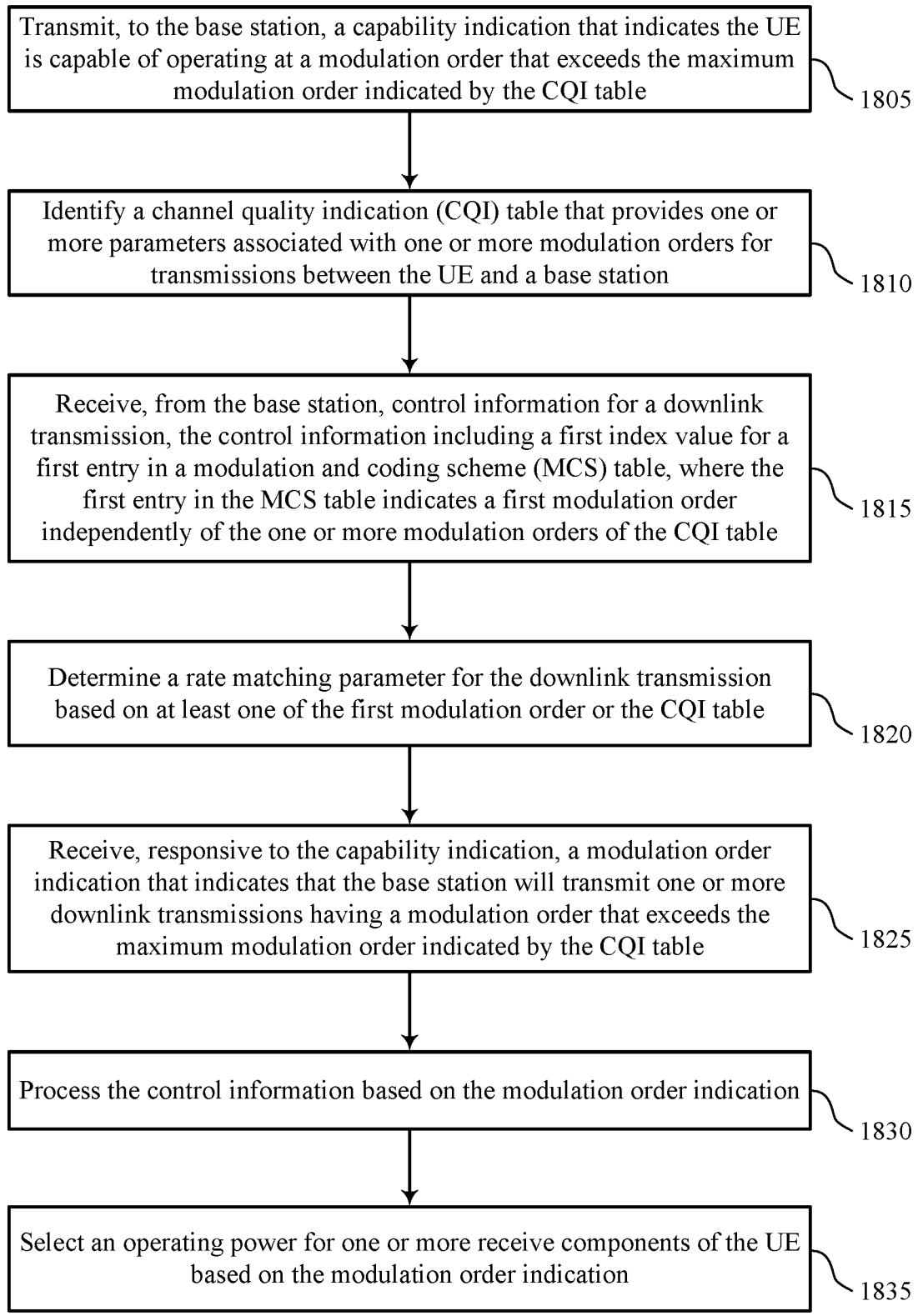

FIG. 18 shows a flowchart illustrating a method 1800 that supports rate matching and semi persistent scheduling configuration in wireless communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1805, the UE may transmit, to the base station, a capability indication that indicates the UE is capable of operating at a modulation order that exceeds the maximum modulation order indicated by the CQI table. The operations of 1805 may be performed according to the methods described herein. In some examples, aspects of the operations of 1805 may be performed by a capability indication component as described with reference to FIGS. 6 through 9.

At 1810, the UE may identify a channel quality indication (CQI) table that provides one or more parameters associated with one or more modulation orders for transmissions between the UE and a base station. The operations of 1810 may be performed according to the methods described herein. In some examples, aspects of the operations of 1810 may be performed by a CQI component as described with reference to FIGS. 6 through 9.

At 1815, the UE may receive, from the base station, control information for a downlink transmission, the control information including a first index value for a first entry in a modulation and coding scheme (MCS) table, where the first entry in the MCS table indicates a first modulation order independently of the one or more modulation orders of the CQI table. The operations of 1815 may be performed according to the methods described herein. In some examples, aspects of the operations of 1815 may be performed by an MCS component as described with reference to FIGS. 6 through 9.

At 1820, the UE may determine a rate matching parameter for the downlink transmission based on at least one of the first modulation order or the CQI table. The operations of 1820 may be performed according to the methods described herein. In some examples, aspects of the operations of 1820 may be performed by a rate matching component as described with reference to FIGS. 6 through 9.

At 1825, the UE may receive, responsive to the capability indication, a modulation order indication that indicates that the base station will transmit one or more downlink transmissions having a modulation order that exceeds the maximum modulation order indicated by the CQI table. The operations of 1825 may be performed according to the methods described herein. In some examples, aspects of the operations of 1825 may be performed by an MCS component as described with reference to FIGS. 6 through 9.

At 1830, the UE may process the control information based on the modulation order indication. The operations of 1830 may be performed according to the methods described herein. In some examples, aspects of the operations of 1830 may be performed by an MCS component as described with reference to FIGS. 6 through 9.

At 1835, the UE may select an operating power for one or more receive components of the UE based on the modulation order indication. The operations of 1835 may be performed according to the methods described herein. In some examples, aspects of the operations of 1835 may be performed by a RF power component as described with reference to FIGS. 6 through 9.

Figure 19:
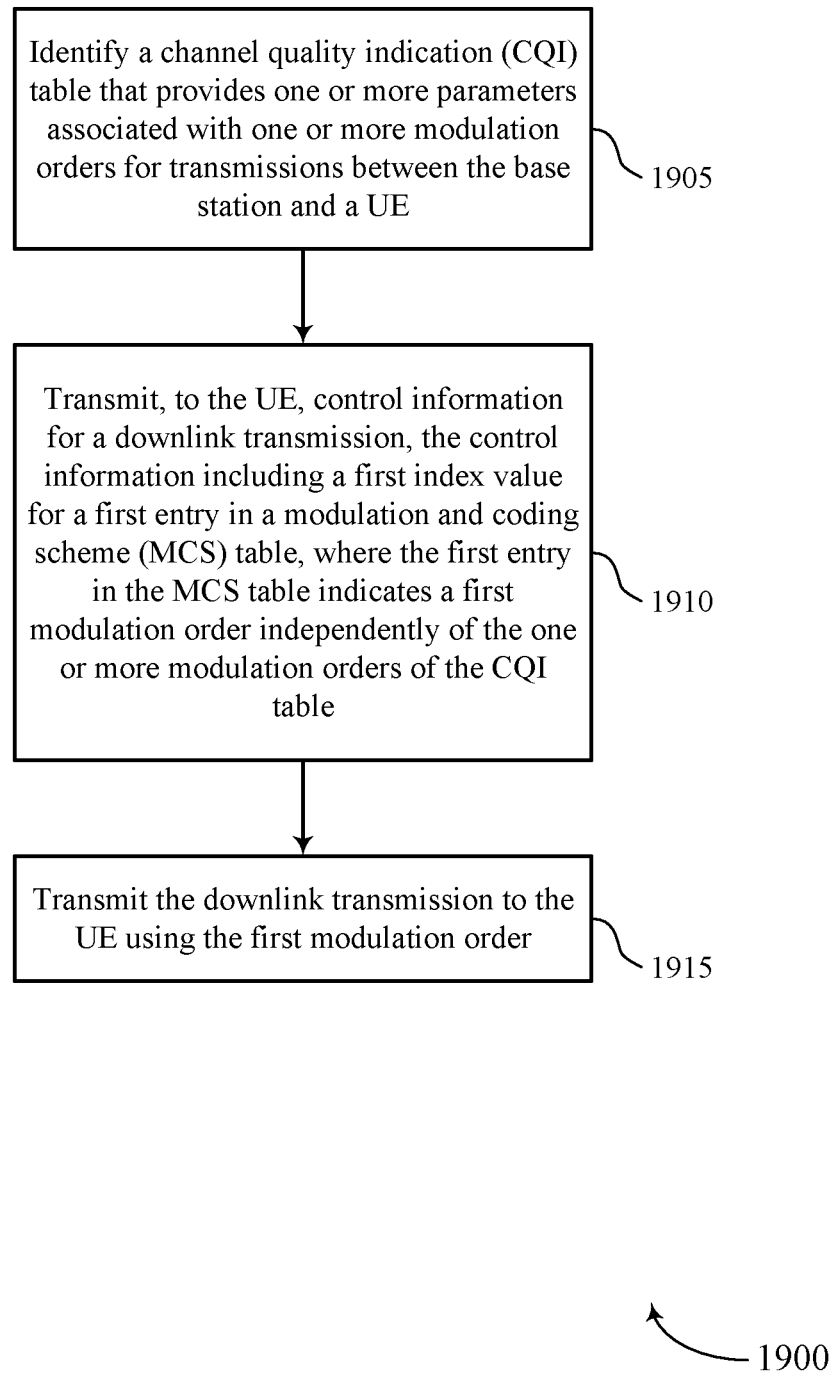

FIG. 19 shows a flowchart illustrating a method 1900 that supports rate matching and semi persistent scheduling configuration in wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1905, the base station may identify a channel quality indication (CQI) table that provides one or more parameters associated with one or more modulation orders for transmissions between the base station and a UE. The operations of 1905 may be performed according to the methods described herein. In some examples, aspects of the operations of 1905 may be performed by a CQI component as described with reference to FIGS. 10 through 13.

At 1910, the base station may transmit, to the UE, control information for a downlink transmission, the control information including a first index value for a first entry in a modulation and coding scheme (MCS) table, where the first entry in the MCS table indicates a first modulation order independently of the one or more modulation orders of the CQI table. The operations of 1910 may be performed according to the methods described herein. In some examples, aspects of the operations of 1910 may be performed by an MCS component as described with reference to FIGS. 10 through 13.

At 1915, the base station may transmit the downlink transmission to the UE using the first modulation order. The operations of 1915 may be performed according to the methods described herein. In some examples, aspects of the operations of 1915 may be performed by a transmitter as described with reference to FIGS. 10 through 13.

Figure 20:
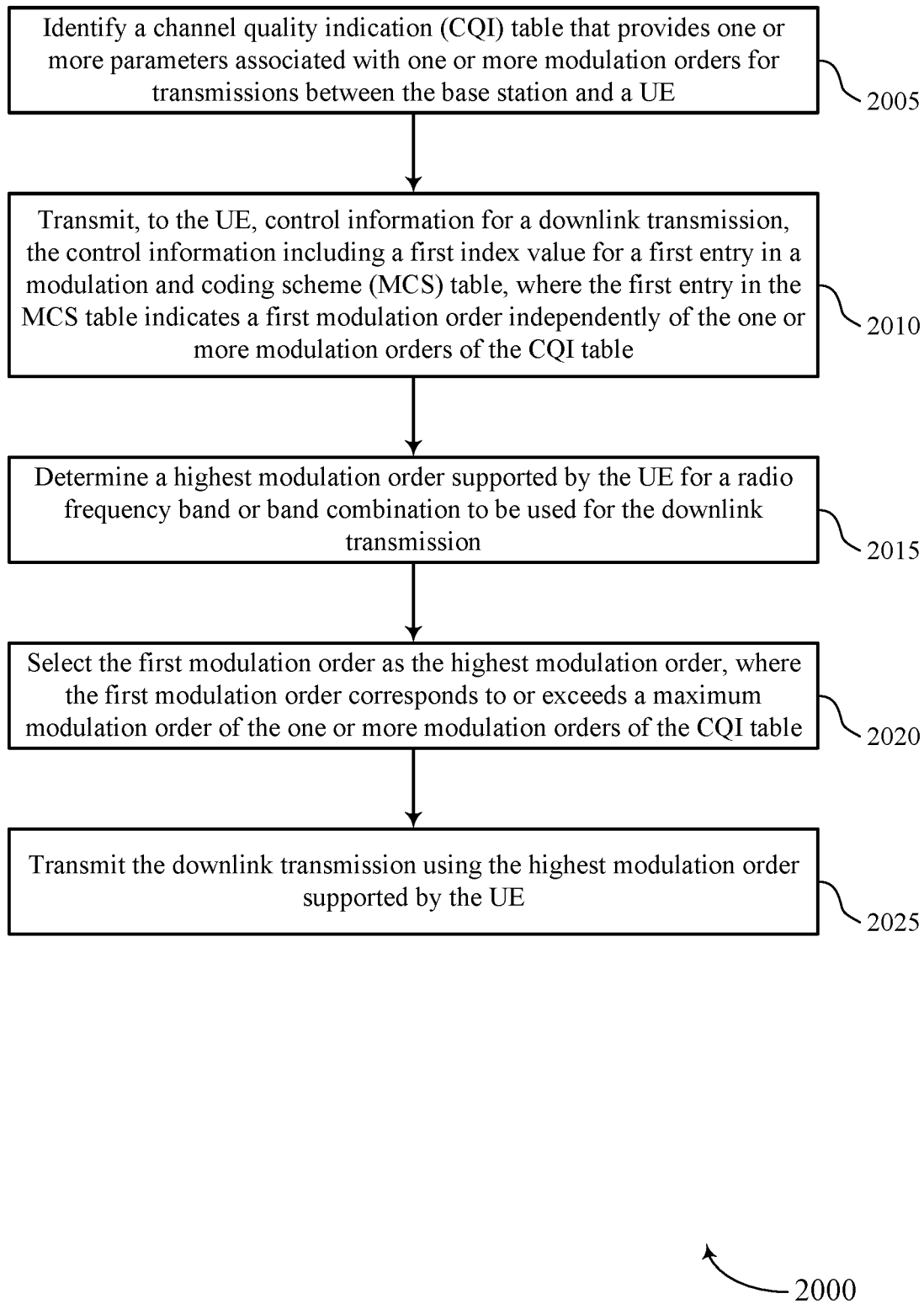

FIG. 20 shows a flowchart illustrating a method 2000 that supports rate matching and semi persistent scheduling configuration in wireless communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 2005, the base station may identify a channel quality indication (CQI) table that provides one or more parameters associated with one or more modulation orders for transmissions between the base station and a UE. The operations of 2005 may be performed according to the methods described herein. In some examples, aspects of the operations of 2005 may be performed by a CQI component as described with reference to FIGS. 10 through 13.

At 2010, the base station may transmit, to the UE, control information for a downlink transmission, the control information including a first index value for a first entry in a modulation and coding scheme (MCS) table, where the first entry in the MCS table indicates a first modulation order independently of the one or more modulation orders of the CQI table. The operations of 2010 may be performed according to the methods described herein. In some examples, aspects of the operations of 2010 may be performed by an MCS component as described with reference to FIGS. 10 through 13.

At 2015, the base station may determine a highest modulation order supported by the UE for a radio frequency band or band combination to be used for the downlink transmission. The operations of 2015 may be performed according to the methods described herein. In some examples, aspects of the operations of 2015 may be performed by an MCS component as described with reference to FIGS. 10 through 13.

At 2020, the base station may select the first modulation order as the highest modulation order, where the first modulation order corresponds to or exceeds a maximum modulation order of the one or more modulation orders of the CQI table. The operations of 2020 may be performed according to the methods described herein. In some examples, aspects of the operations of 2020 may be performed by an MCS component as described with reference to FIGS. 10 through 13.

At 2025, the base station may transmit the downlink transmission using the highest modulation order supported by the UE. The operations of 2025 may be performed according to the methods described herein. In some examples, aspects of the operations of 2025 may be performed by an MCS component as described with reference to FIGS. 10 through 13.

Figure 21:
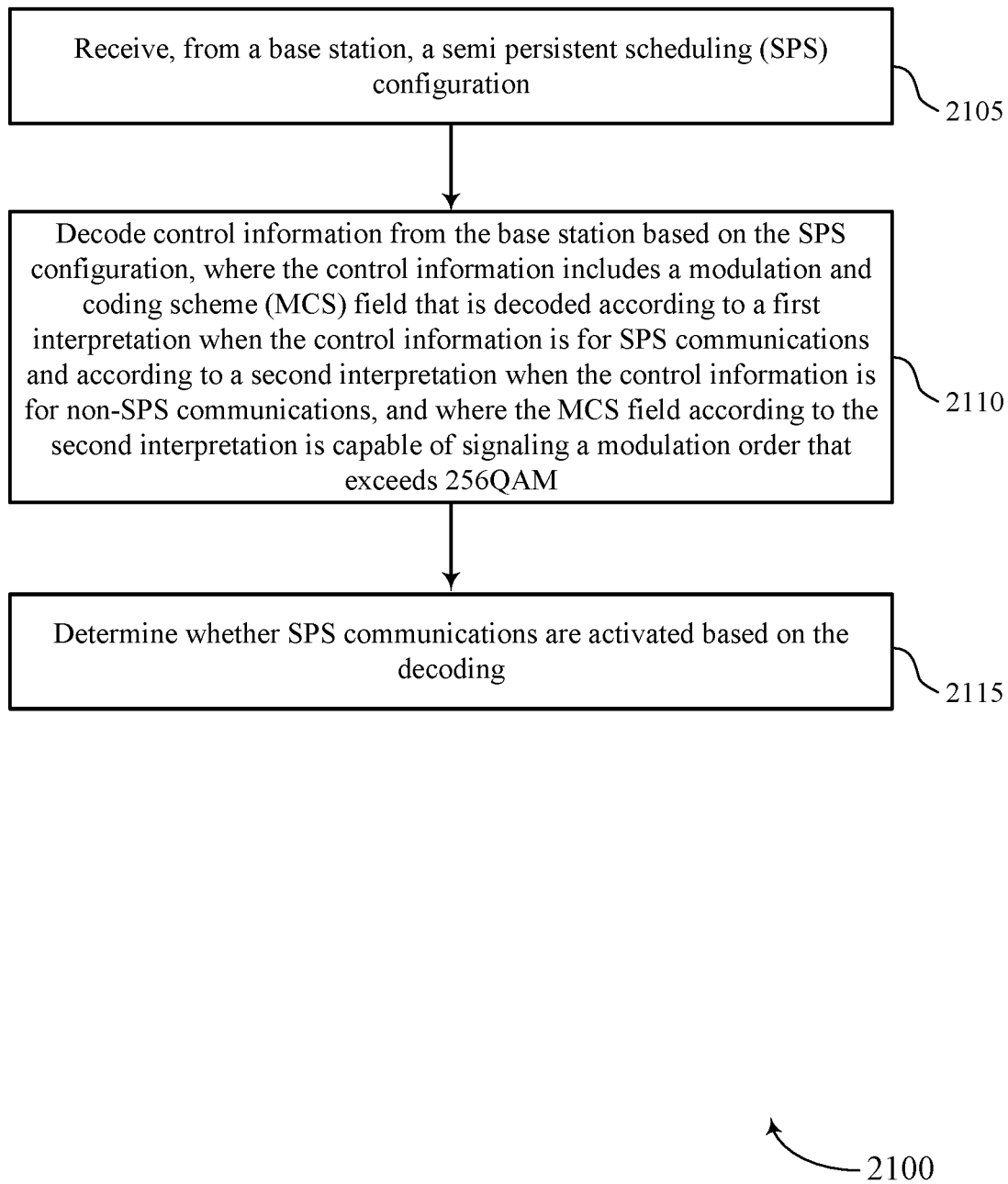

FIG. 21 shows a flowchart illustrating a method 2100 that supports rate matching and semi persistent scheduling configuration in wireless communications in accordance with aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 2105, the UE may receive, from a base station, a semi persistent scheduling (SPS) configuration. The operations of 2105 may be performed according to the methods described herein. In some examples, aspects of the operations of 2105 may be performed by a configuration manager as described with reference to FIGS. 6 through 9.

At 2110, the UE may decode control information from the base station based on the SPS configuration, where the control information includes a modulation and coding scheme (MCS) field that is decoded according to a first interpretation when the control information is for SPS communications and according to a second interpretation when the control information is for non-SPS communications, and where the MCS field according to the second interpretation is capable of signaling a modulation order that exceeds 256QAM. The operations of 2110 may be performed according to the methods described herein. In some examples, aspects of the operations of 2110 may be performed by a SPS component as described with reference to FIGS. 6 through 9. In some cases, the MCS field is a six-bit MCS field, and a subset of bits of the six-bit MCS field are used for the first interpretation. In some cases, the two most significant bits of the MCS field are set to zero for the first interpretation. In some cases, retransmissions of information in the MCS field are disallowed for the first interpretation. In some cases, the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries. In some examples, the second subset of entries include one or more entries of the MCS table that indicate scaling parameters, one or more entries indicating a modulation order that exceeds a 64 QAM modulation order, one or more entries for retransmissions of MCS, or any combinations thereof.

At 2115, the UE may determine whether SPS communications are activated based on the decoding. The operations of 2115 may be performed according to the methods described herein. In some examples, aspects of the operations of 2115 may be performed by a SPS component as described with reference to FIGS. 6 through 9.

Figure 22:
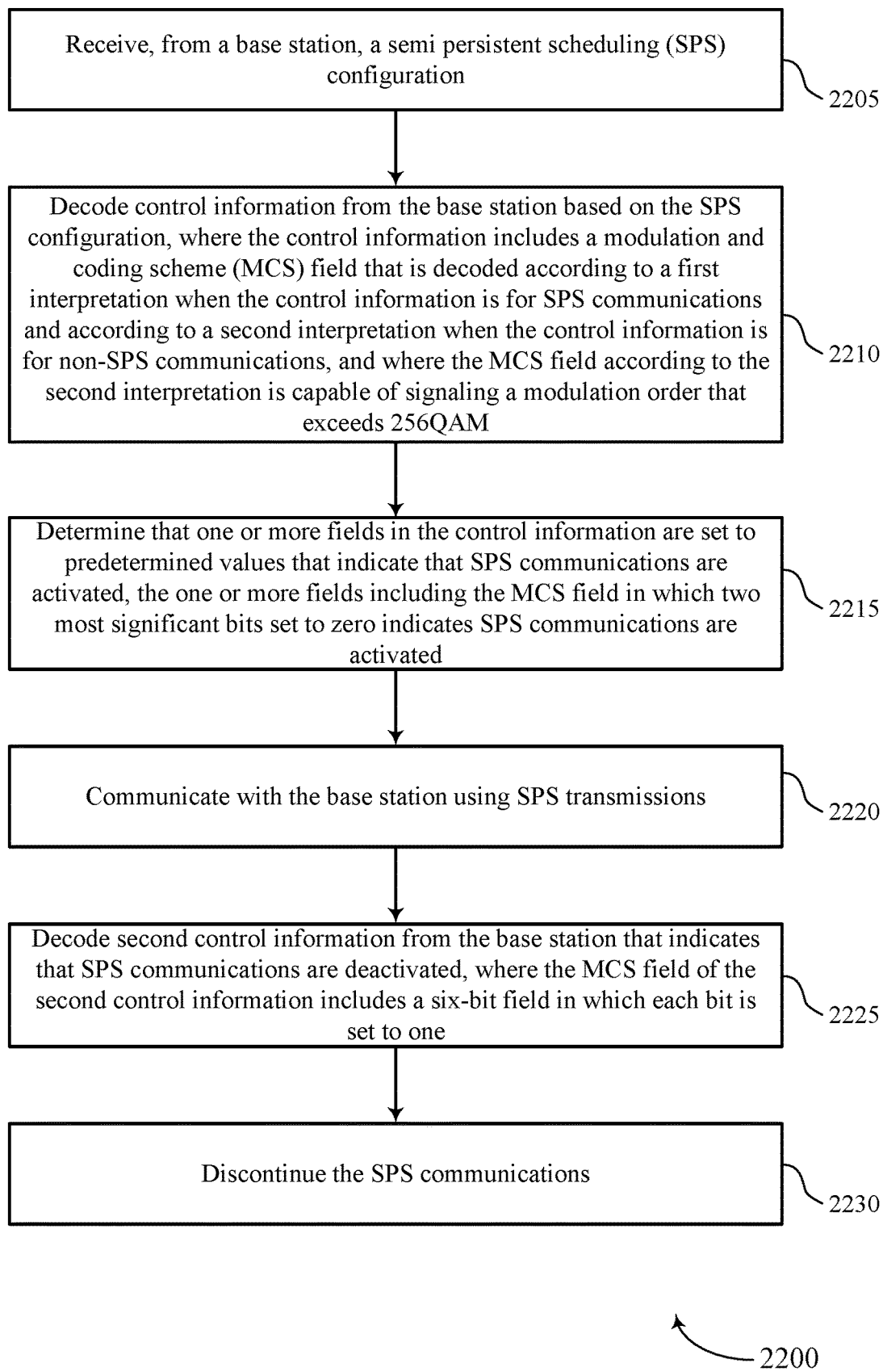

FIG. 22 shows a flowchart illustrating a method 2200 that supports rate matching and semi persistent scheduling configuration in wireless communications in accordance with aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 2205, the UE may receive, from a base station, a semi persistent scheduling (SPS) configuration. The operations of 2205 may be performed according to the methods described herein. In some examples, aspects of the operations of 2205 may be performed by a configuration manager as described with reference to FIGS. 6 through 9.

At 2210, the UE may decode control information from the base station based on the SPS configuration, where the control information includes a modulation and coding scheme (MCS) field that is decoded according to a first interpretation when the control information is for SPS communications and according to a second interpretation when the control information is for non-SPS communications, and where the MCS field according to the second interpretation is capable of signaling a modulation order that exceeds 256QAM. The operations of 2210 may be performed according to the methods described herein. In some examples, aspects of the operations of 2210 may be performed by a SPS component as described with reference to FIGS. 6 through 9.

At 2215, the UE may determine that one or more fields in the control information are set to predetermined values that indicate that SPS communications are activated, the one or more fields including the MCS field in which two most significant bits set to zero indicates SPS communications are activated. The operations of 2215 may be performed according to the methods described herein. In some examples, aspects of the operations of 2215 may be performed by a SPS component as described with reference to FIGS. 6 through 9.

At 2220, the UE may communicate with the base station using SPS transmissions. The operations of 2220 may be performed according to the methods described herein. In some examples, aspects of the operations of 2220 may be performed by a SPS component as described with reference to FIGS. 6 through 9.

At 2225, the UE may decode second control information from the base station that indicates that SPS communications are deactivated, where the MCS field of the second control information includes a six-bit field in which each bit is set to one. The operations of 2225 may be performed according to the methods described herein. In some examples, aspects of the operations of 2225 may be performed by a SPS component as described with reference to FIGS. 6 through 9.

At 2230, the UE may discontinue the SPS communications. The operations of 2230 may be performed according to the methods described herein. In some examples, aspects of the operations of 2230 may be performed by a SPS component as described with reference to FIGS. 6 through 9.

Figure 23:
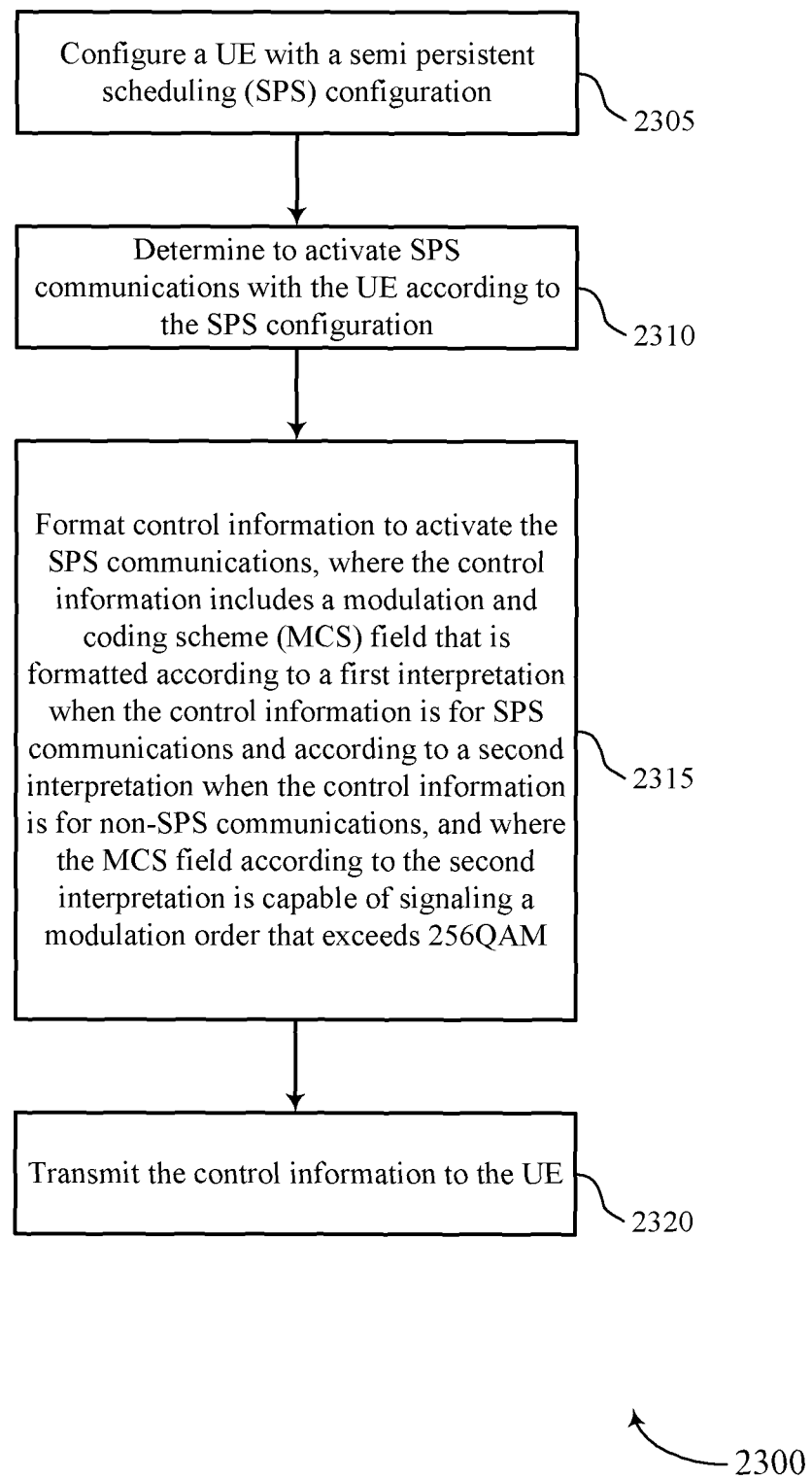

FIG. 23 shows a flowchart illustrating a method 2300 that supports rate matching and semi persistent scheduling configuration in wireless communications in accordance with aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 2305, the base station may configure a UE with a semi persistent scheduling (SPS) configuration. The operations of 2305 may be performed according to the methods described herein. In some examples, aspects of the operations of 2305 may be performed by a configuration manager as described with reference to FIGS. 10 through 13.

At 2310, the base station may determine to activate SPS communications with the UE according to the SPS configuration. The operations of 2310 may be performed according to the methods described herein. In some examples, aspects of the operations of 2310 may be performed by a SPS component as described with reference to FIGS. 10 through 13.

At 2315, the base station may format control information to activate the SPS communications, where the control information includes a modulation and coding scheme (MCS) field that is formatted according to a first interpretation when the control information is for SPS communications and according to a second interpretation when the control information is for non-SPS communications, and where the MCS field according to the second interpretation is capable of signaling a modulation order that exceeds 256QAM. The operations of 2315 may be performed according to the methods described herein. In some examples, aspects of the operations of 2315 may be performed by a SPS component as described with reference to FIGS. 10 through 13.

At 2320, the base station may transmit the control information to the UE. The operations of 2320 may be performed according to the methods described herein. In some examples, aspects of the operations of 2320 may be performed by a transmitter as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a semi persistent scheduling (SPS) configuration;
   decoding control information from the base station based at least in part on the SPS configuration, wherein the control information includes a modulation and coding scheme (MCS) field that is decoded according to a first interpretation when the control information is for SPS communications and according to a second interpretation when the control information is for non-SPS communications, and wherein the MCS field according to the first interpretation is capable of signaling a first modulation order and the MCS field according to the second interpretation is capable of signaling a second modulation order that exceeds 256 quadrature amplitude modulation, the second modulation order different from the first modulation order; and
   determining whether SPS communications are activated based at least in part on the decoding.

2. The method of claim 1, wherein the MCS field is a six-bit MCS field, and a subset of bits of the six-bit MCS field are used for the first interpretation.

3. The method of claim 2, wherein two most significant bits of the MCS field are set to zero for the first interpretation.

4. The method of claim 2, wherein retransmissions of information in the MCS field are disallowed for the first interpretation.

5. The method of claim 1, wherein the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries.

6. The method of claim 5, wherein the second subset of entries include one or more entries of the MCS table that indicate scaling parameters, one or more entries indicating a modulation order that exceeds a 64 quadrature amplitude modulation order, one or more entries for retransmissions of MCS, or any combinations thereof.

7. The method of claim 1, wherein the determining whether SPS communications are activated comprises:
   determining that one or more fields in the control information are set to predetermined values that indicate that SPS communications are activated, the one or more fields including the MCS field in which two most significant bits set to zero indicates SPS communications are activated.

8. The method of claim 1, wherein the control information is first control information that activates SPS communications, and wherein the method further comprises:
   communicating with the base station using SPS transmissions;

decoding second control information from the base station that indicates that SPS communications are deactivated, wherein the MCS field of the second control information comprises a six-bit field in which each bit is set to one; and discontinuing the SPS communications.

9. A method for wireless communication at a base station, comprising:

configuring a user equipment (UE) with a semi persistent scheduling (SPS) configuration;

determining to activate SPS communications with the UE according to the SPS configuration;

formatting control information to activate the SPS communications, wherein the control information includes a modulation and coding scheme (MCS) field that is formatted according to a first interpretation when the control information is for SPS communications and according to a second interpretation when the control information is for non-SPS communications, and wherein the MCS field according to the first interpretation is capable of signaling a first modulation order and the MCS field according to the second interpretation is capable of signaling a second modulation order that exceeds 256 quadrature amplitude modulation, the second modulation order different from the first modulation order; and transmitting the control information to the UE.

10. The method of claim 9, wherein the MCS field is a six-bit MCS field, and a subset of bits of the six-bit MCS field are used for the first interpretation.

11. The method of claim 10, wherein the formatting further comprises:

setting two most significant bits of the MCS field to zero for the first interpretation.

12. The method of claim 10, wherein retransmissions of information in the MCS field are disallowed for the first interpretation.

13. The method of claim 9, wherein the MCS field for the first interpretation is capable of indicating a first subset of entries of an MCS table, and the MCS field for the second interpretation is capable of indicating the first subset of entries of the MCS table and a second subset of entries of the MCS table that is different than the first subset of entries.

14. The method of claim 13, wherein the second subset of entries include one or more entries of the MCS table that indicate scaling parameters, one or more entries indicating a modulation order that exceeds a 64 quadrature amplitude modulation order, one or more entries for retransmissions of MCS, or any combinations thereof.

15. The method of claim 9, wherein the formatting control information to activate the SPS communications comprises:

setting one or more fields in the control information to predetermined values that indicate that SPS is activated, the one or more fields including the MCS field in which two most significant bits are set to zero to indicate SPS communications are activated.

16. The method of claim 9, further comprising:
communicating with the UE using SPS transmissions;
determining to deactivate the SPS communications;

formatting second control information that indicates that SPS communications are deactivated, wherein the MCS field of the second control information comprises a six-bit field in which each bit is set to one;

transmitting the second control information to the UE; and discontinuing the SPS communications.

17. An apparatus for wireless communication, comprising:

a processor, memory coupled with the processor; and instructions stored in the memory and operable, when executed by the processor to cause the apparatus to:

receive, from a base station, a semi persistent scheduling (SPS) configuration;

decode control information from the base station based at least in part on the SPS configuration, wherein the control information includes a modulation and coding scheme (MCS) field that is decoded according to a first interpretation when the control information is for SPS communications and according to a second interpretation when the control information is for non-SPS communications, and wherein the MCS field according to the first interpretation is capable of signaling a first modulation order and the MCS field according to the second interpretation is capable of signaling a second modulation order that exceeds 256 quadrature amplitude modulation, the second modulation order different from the first modulation order; and determine whether SPS communications are activated based at least in part on the decoding.

18. The apparatus of claim 17, further comprising:

at least one antenna for receiving the SPS configuration, and wherein the MCS field is a six-bit MCS field, and a subset of bits of the six-bit MCS field are used for the first interpretation.

19. The apparatus of claim 17, wherein the instructions to determine whether SPS communications are activated are further executable by the processor to cause the apparatus to:

determine that one or more fields in the control information are set to predetermined values that indicate that SPS communications are activated, the one or more fields including the MCS field in which two most significant bits set to zero indicates SPS communications are activated.

20. The apparatus of claim 17, wherein the control information is first control information that activates SPS communications, and wherein the instructions are further executable by the processor to cause to the apparatus to the method further comprises:

communicate with the base station using SPS transmissions;

decode second control information from the base station that indicates that SPS communications are deactivated, wherein the MCS field of the second control information comprises a six-bit field in which each bit is set to one; and discontinue the SPS communications.

* * * * *